(12) United States Patent
Heo et al.

(10) Patent No.: US 9,219,949 B2
(45) Date of Patent: Dec. 22, 2015

(54) DISPLAY APPARATUS, INTERACTIVE SERVER, AND METHOD FOR PROVIDING RESPONSE INFORMATION

(71) Applicant: SAMSUNG ELECTRONICS CO., LTD., Suwon-si (KR)

(72) Inventors: Hye-hyun Heo, Suwon-si (KR); Hae-rim Son, Seoul (KR); Jun-hyung Shin, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 13/887,548

(22) Filed: May 6, 2013

(65) Prior Publication Data
US 2013/0339020 A1    Dec. 19, 2013

(30) Foreign Application Priority Data
Jun. 14, 2012    (KR) .................. 10-2012-0063811

(51) Int. Cl.
*H04N 21/482*    (2011.01)
*G10L 21/00*    (2013.01)
(Continued)

(52) U.S. Cl.
CPC ......... *H04N 21/482* (2013.01); *H04N 5/44513* (2013.01); *H04N 5/44543* (2013.01); *H04N 21/233* (2013.01); *H04N 21/2393* (2013.01); *H04N 21/25891* (2013.01);
(Continued)

(58) Field of Classification Search
CPC ... G06Q 50/01; G06Q 40/00; H04N 21/4363; H04N 21/43637; H04N 21/64322; H04N 7/163; H04N 7/15; G06F 3/0481; H05K 999/00
USPC .................. 704/254, 275, 231, 270, E15.045; 600/300; 340/905, 995.13; 701/400
See application file for complete search history.

(56) References Cited

U.S. PATENT DOCUMENTS 7,392,193 B2 *  6/2008  Mault ........................... 704/275
8,319,661 B2 * 11/2012  Nagatomo .................... 340/905
(Continued)

FOREIGN PATENT DOCUMENTS

WO        01/84539 A1    11/2001
WO     2011/000749 A1     1/2011

OTHER PUBLICATIONS

Communication from the European Patent Office issued Oct. 8, 2013 in counterpart European Application No. 13165183.8.

*Primary Examiner* — Charlotte M Baker
(74) *Attorney, Agent, or Firm* — Sughrue Mion, PLLC

(57) ABSTRACT

A display apparatus, an interactive server, and a method for providing response information are provided. The display apparatus includes: a voice collector which collects a user's uttered voice, a communication unit which communicates with an interactive server; and, a controller which, if response information corresponding to the uttered voice which is transmitted to the interactive server is received from the interactive server, controls to perform an operation corresponding to the user's uttered voice based on the response information, wherein the response information is generated in a different form according to a function of the display apparatus which is classified based on an utterance element extracted from the uttered voice. Accordingly the display apparatus can execute the function corresponding to each of the uttered voices and can output the response message corresponding to each of the uttered voices, even if a variety of uttered voices are input from the user.

21 Claims, 10 Drawing Sheets

(51) Int. Cl.
  *H04N 5/445*  (2011.01)
  *H04N 21/233*  (2011.01)
  *H04N 21/239*  (2011.01)
  *H04N 21/258*  (2011.01)
  *H04N 21/422*  (2011.01)
  *H04N 21/4223*  (2011.01)
  *H04N 21/441*  (2011.01)
  *H04N 21/658*  (2011.01)

(52) U.S. Cl.
  CPC .... *H04N 21/4223* (2013.01); *H04N 21/42203* (2013.01); *H04N 21/441* (2013.01); *H04N 21/4828* (2013.01); *H04N 21/6581* (2013.01); *H04N 21/6582* (2013.01); *H04N 2005/44556* (2013.01)

(56) References Cited

U.S. PATENT DOCUMENTS

| | | |
|---|---|---|
| 2008/0208589 A1 | 8/2008 | Cross et al. |
| 2012/0030712 A1 | 2/2012 | Chang |

\* cited by examiner

DISPLAY APPARATUS, INTERACTIVE SERVER, AND METHOD FOR PROVIDING RESPONSE INFORMATION

CROSS-REFERENCE TO RELATED APPLICATION

This application claims priority from Korean Patent Application No. 10-2012-0063811, filed on Jun. 14, 2012 in the Korean Intellectual Property Office, the disclosure of which is incorporated herein by reference in its entirety.

BACKGROUND

1. Field

Methods and apparatuses consistent with exemplary embodiments relate to a display apparatus, an interactive server, and a method for providing response information, and more particularly, to a display apparatus and an interactive server which provide response information corresponding to a user's uttered voice, and a method for providing response information.

2. Description of the Related Art

A display apparatus capable of recognizing a voice collects a voice uttered by a user and transmits the collected voice to an external server through a network. After that, the display apparatus receives information regarding the uttered voice, which has been converted in a format recognizable by the display apparatus, from the external server, analyzes the information of the uttered voice, and grasps a meaning of the user's uttered voice. After that, the display apparatus executes a function corresponding to the user's uttered voice based on the grasped result, and outputs a guide message regarding the user's uttered voice if necessary.

However, such a related-art display apparatus may place limits to executing functions corresponding to a user's uttered voice, and may just execute or avoid the functions corresponding to the user's uttered voice.

Specifically, if the display apparatus enters a voice recognition mode according to a request from the user, the display apparatus displays a command to control an operation of the display apparatus through a user's uttered voice on a screen. Therefore, the user utters a voice corresponding to a function he/she wishes to perform with reference to the command on operation control of the display apparatus, which is displayed on the screen.

If the user's uttered voice is input, the display apparatus receives information on the user's uttered voice from an external server, analyzes the information regarding the uttered voice, and executes a function requested by the user or displays text information regarding a voice re-request on the screen.

That is, the related-art display apparatus only performs an operation corresponding to the users' uttered voice based on the pre-set command or re-requests the user to utter a voice, and does not provide different response information in response to a variety of user's uttered voices. Therefore, there is a demand for development of an interactive system for providing different response information in response to a variety of user's uttered voices.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus which can provide different response information in response to a variety of user's uttered voices.

According to an aspect of an exemplary embodiment, there is provided a display apparatus including: a voice collector which collects a user's uttered voice, a communication unit which communicates with an interactive server, and a controller which, if response information corresponding to the uttered voice which is transmitted to the interactive server is received from the interactive server, controls to perform an operation corresponding to the user's uttered voice based on the response information, wherein the response information is generated in a different form according to a function which is classified based on an utterance element extracted from the uttered voice.

The function may include at least one of an electronic program guide (EPG)-related function and an operation control function of the display apparatus.

The display apparatus may further include an output unit, and, if the uttered voice includes an EPG-related utterance element or an operation control-related utterance element of the display apparatus, the controller may perform at least one of an operation of outputting a response message and an operation of performing a function, based on the response information received from the interactive server.

If the uttered voice includes an EPG-related utterance element regarding a plurality of requests, the controller may output a voice re-request message based on the response information received from the interactive server.

The display apparatus may further include an output unit, and, if the uttered voice includes a prohibited utterance element, the controller may control to output a disallowed message regarding an operation corresponding to the uttered voice, based on the response information received from the interactive server.

The display apparatus may further include: a storage which matches a user's face image and user information with each other, and stores matching information, and a photographing unit which photographs a user's face. The controller may transmit user information matched with a face image generated by the photographing unit and the uttered voice to the interactive server, and, if the prohibited utterance element is associated with a user's age, the controller may control to output the disallowed message regarding the operation corresponding to the uttered voice according to the response information generated based on the user information.

The interactive server may include a first server which converts the collected voice into text information and a second server which generates response information corresponding to the uttered voice which has been converted into the text information. The controller may convert the collected voice into a digital signal and transmit the converted voice to the first server, and, if text information regarding the uttered voice is received from the first server, may transmit the text information to the second server and receive response information corresponding to the uttered voice.

According to an aspect of another exemplary embodiment, there is provided an interactive server including: a communication unit which communicates with a display apparatus, an extraction unit which extracts an utterance element from an uttered voice which is received from the display apparatus, and a controller which generates response information corresponding to the uttered voice in a different form based on a function, which is classified according to the extracted utterance element, and transmits the response information to the display apparatus.

The function may include at least one of an EPG-related function and an operation control function of the display apparatus.

The interactive server may further include a storage which stores EPG information, and, if the extracted utterance element is an EPG-related utterance element, the controller may determine whether it is possible to provide the EPG information corresponding to the uttered voice based on the EPG information stored in the storage If it is possible to provide the EPG information, the controller may generate response information corresponding to the uttered voice based on the EPG information, and, if it is impossible to provide the EPG information, the controller may generate alternative response information regarding the uttered voice based on at least one of the EPG information and an Internet search.

If the uttered voice includes an EPG-related utterance element regarding a plurality of requests, the controller may generate a voice re-request message to re-request a user to utter a voice in the display apparatus.

If the extracted utterance element is an operation control-related utterance element of the display apparatus, the controller may determine whether it is possible to control an operation of the display apparatus corresponding to the uttered voice based on the utterance element. If it is possible to control the operation of the display apparatus, the controller may generate response information for controlling the operation of the display apparatus, and, if it is impossible to control the operation of the display apparatus, the controller may generate response information regarding at least one of an operation control method of the display apparatus and a current state notification.

The interactive server may further include a storage which stores a table regarding a prohibited utterance element. If the extracted utterance element includes the prohibited utterance element, the controller may generate a disallowed message regarding the operation corresponding to the uttered voice.

The communication unit may further receive user information from the display apparatus, and, if the extracted utterance element is associated with a user's age, the controller may determine whether to generate the disallowed message regarding the operation corresponding to the uttered voice based on the user information.

According to an aspect of still another exemplary embodiment, there is provided a method for providing response information corresponding to a user's uttered voice in an interactive server which is interlocked with a display apparatus, the method including: receiving the user's uttered voice from the display apparatus, extracting an utterance element from the uttered voice, generating response information corresponding to the uttered voice in a different form based on a function which is classified according to the extracted utterance element, and transmitting the response information to the display apparatus.

The function may include at least one of an EPG-related function and an operation control function of the display apparatus, and the generating may include: determining whether the extracted utterance element is an EPG-related utterance element, if the extracted utterance element is the EPG-related utterance element as a result of the determining, determining whether EPG information corresponding to the uttered voice may be provided based on pre-stored EPG information, and if the EPG information may be provided as a result of the determining, generating response information corresponding to the utterance element based on the EPG information, and, if the EPG information cannot be provided, generating alternative response information regarding the uttered voice based on at least one of the EPG information and an Internet search.

The generating may further include: if the extracted utterance element is the EPG-related utterance element as a result of the checking, checking whether the uttered voice includes an EPG-related utterance element regarding a plurality of requests, and, if the uttered voice includes the EPG-related utterance element regarding the plurality of requests as a result of the checking, generating a voice re-request message to re-request a user to utter a voice in the display apparatus.

The generating may further include: if the extracted utterance element is an operation control-related utterance element of the display apparatus as a result of the checking, checking whether it is possible to control an operation of the display apparatus corresponding to the uttered voice based on the utterance element, if it is possible to control the operation of the display apparatus as a result of the checking, generating response information for controlling the operation of the display apparatus, and, if it is impossible to control the operation of the display apparatus, generating response information regarding at least one of a method for controlling the operation of the display apparatus and a current state notification.

The method may further include: checking whether the extracted utterance element includes a prohibited utterance element with reference to a pre-stored table regarding the prohibited utterance element, and if the extracted utterance element includes the prohibited utterance element as a result of the checking, generating a disallowed message regarding an operation corresponding to the uttered voice.

The receiving may further receive user information from the display apparatus, and may further include: if the extracted utterance element does not include the prohibited utterance element as a result of the checking, checking whether the extracted utterance element is associated with a user's age, and, if the extracted utterance element is associated with the user's age as a result of the checking, generating the disallowed message regarding the operation corresponding to the uttered voice based on the user information.

According to the exemplary embodiments described above, the display apparatus may execute the function corresponding to each of the uttered voices and may output the response message corresponding to each of the uttered voices, even if a variety of uttered voices are input from the user.

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Figure 1:
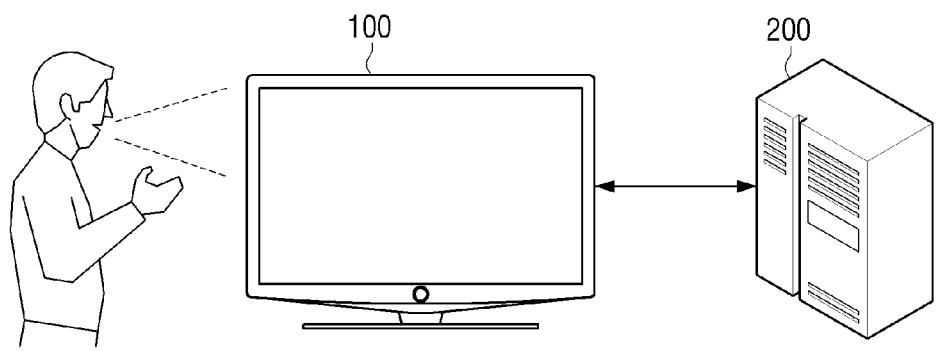
FIG. 1 is a view illustrating a first example of an interactive system which provides response information appropriate to a user's uttered voice according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a view illustrating a first example of an interactive system which provides response information appropriate to a user's uttered voice according to an exemplary embodiment.

As shown in FIG. 1, an interactive system according to an exemplary embodiment includes a display apparatus 100 and an interactive server 200. The display apparatus 100 may be realized by various kinds of electronic apparatuses, which can access the Internet, such as a smart television (TV), a mobile phone including a smart phone, a desktop personal computer (PC), a laptop PC, or a navigation apparatus.

The display apparatus 100 collects a user's uttered voice and performs an operation corresponding to the uttered voice. For example, if a user's uttered voice to change a channel is input, the display apparatus 100 selects a corresponding channel and displays the channel. In this case, the display apparatus 100 may also provide a response message corresponding to the function. In the above example, the display apparatus 100 may output information regarding the changed channel as a voice or an image of a text format. Also, if a user's uttered voice to inquire about an air time of a specific program is input, the display apparatus 100 may output the air time of the specific program as a voice or an image of a text format.

To achieve this, the display apparatus 100 transmits the collected voice to the interactive server 200. The interactive server 200, which has received the user's uttered voice, analyzes the meaning of the user's uttered voice received from the display apparatus 100, generates response information for controlling an operation of the display apparatus 100, and transmits the response information to the display apparatus 100. That is, if the user's uttered voice is received from the display apparatus 100, the interactive server 200 extracts an utterance element from the uttered voice, generates response information regarding the user's uttered voice based on the extracted utterance element, and transmits the response information. The utterance element may be a keyword that is to perform an operation requested by the user in the user's uttered voice. For example, if the user's uttered voice is "What time will the program ○○○ be aired this Saturday?", the utterance element may be "this Saturday", "○○○ (program title)", "what time", and "aired".

The interactive server 200, which has extracted the utterance element from the uttered voice as described above, generates response information disallowing the operation corresponding to the uttered voice if the extracted utterance element includes a limited or prohibited utterance element (for example, a keyword regarding a prohibited drug or a profanity), and transmits the response information to the display apparatus 100 indicating that the requested operation has not been allowed. The interactive server 200 may receive user information of the user along with the user's uttered voice from the display apparatus 100. Accordingly, if the extracted utterance element includes an utterance element associated with a user's age (for example, a keyword related to obscenity or violence) as a result of analyzing the user's uttered voice, the interactive server 200 may generate response information disallowing the operation corresponding to the uttered voice based on the user information and transmits the response information to the display apparatus 100 indicating that the requested operation has not been allowed. If the extracted utterance element does not include the prohibited utterance element described above, the interactive server 200 generates response information for performing the operation corresponding to the user's uttered voice based on the utterance element extracted from the user's uttered voice, and transmits the response information to the display apparatus 100.

For example, the display apparatus 100 may collect an uttered voice associated with an electronic program guide (EPG) such as "What time will the program ○○○ be aired this Saturday?" from the user. If such an uttered voice is collected, the display apparatus 100 transmits the collected voice to the interactive server 200. The uttered voice may be an analog signal. Accordingly, the display apparatus 100 may convert the collected voice into a digital signal and then may transmit the uttered voice, which is the converted digital signal, to the interactive server 200. If the uttered voice which has been converted into the digital signal is received, the interactive server 100 generates text information based on the uttered voice which has been converted into the digital signal, analyzes the text information, and generate response information corresponding to the user's uttered voice. However, this should not be considered as limiting. The display apparatus 100 may transmit the collected voice to the interactive server 200 without separate signal processing. In this case, the interactive server 200 may convert the user's uttered voice which has been received from the display apparatus 100 into a digital signal, and then may generate text information regarding the user's uttered voice based on the converted digital signal. The method of generating the text information through the user's uttered voice is well known in the related art and thus a detailed description thereof is omitted.

As described above, if the text information regarding the uttered voice saying "What time will the program ○○○ be aired this Saturday?" is generated, the interactive server 200 analyzes the uttered voice saying "What time will the program ○○○ be aired this Saturday?" and extracts the utterance element. The extracted utterance element may be "this Saturday", "○○○(program name)", "what time", and "aired". If such an utterance element is extracted, the interactive server 200 generates response information on an airtime of the program based on the extracted utterance element, and transmits the response information to the display apparatus 100. Accordingly, the display apparatus 100 may output a response message saying "The program ooo will be aired at 7" as a voice or an image of a text format based on the received response information.

For another example, the display apparatus 100 may collect an uttered voice saying "Please schedule a recording of the program ooo which airs this Saturday" from the user. If such an uttered voice is collected, the display apparatus 100 transmits the collected voice to the interactive server 200. In this case, the interactive server 200 extracts an utterance element from the uttered voice saying "Please schedule a recording of the program ooo which airs this Saturday", generates response information including a control command to schedule the recording of the program ooo at a time when the program airs and a response message saying "The recording of the program has been scheduled", based on the extracted utterance element, and transmits the response information to the display apparatus 100. Accordingly, the display apparatus 100 schedules the recording of the program and also outputs the response message saying "The recording of the program ooo has been scheduled" as a voice or an image of a text format, based on the response information.

The above-described interactive server 200 may include a first server 10 to generate text information regarding the user's uttered voice which has been converted into the digital signal, and a second server 20 to generate response information corresponding to the uttered voice based on the text information. Hereinafter, an interactive system for providing response information appropriate to a user's uttered voice through a display apparatus 100 and a first server 10 and a second server 20 will be explained in detail.

Figure 2:
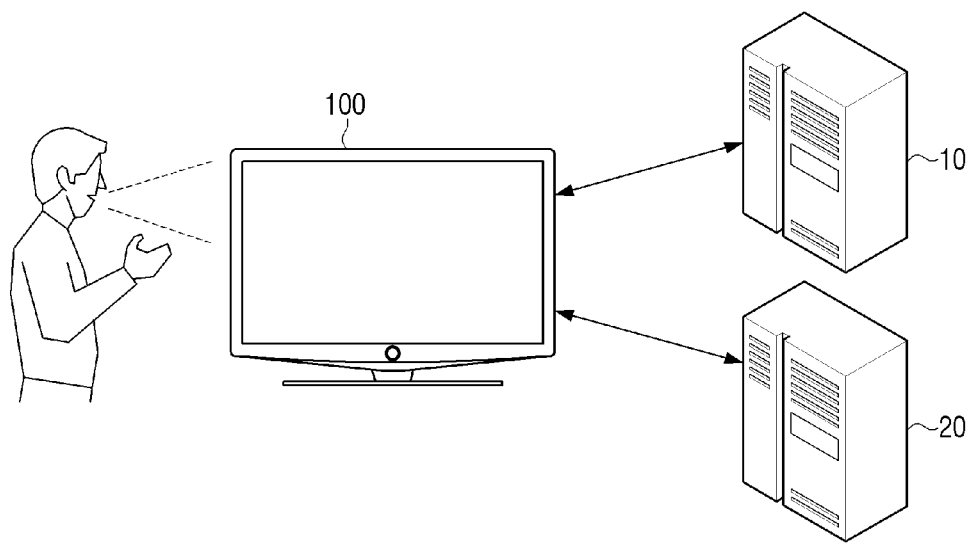
FIG. 2 is a view illustrating a second example of an interactive system which provides response information appropriate to a user's uttered voice according to another exemplary embodiment.

FIG. 2 is a view illustrating a second example of an interactive system which provides response information appropriate to a user's uttered voice according to another exemplary embodiment.

As shown in FIG. 2, if a display apparatus 100 collects a voice uttered by a user, the display apparatus 100 converts the collected voice into a digital signal and transmits the voice to a first server 10. If the uttered voice which has been converted into the digital signal is received, the first server 10 generates text information regarding the user's uttered voice according to a specific pre-stored pattern regarding a variety of uttered voices, and transmits the text information to the display apparatus 100.

The display apparatus, which has received the text information regarding the user's uttered voice from the first server, transmits the text information regarding the user's uttered voice to a second server 20. The second server 20, which has received the text information regarding the user's uttered voice, analyzes the text information, extracts an utterance element, generates response information for performing an operation corresponding to the user's uttered voice based on the extracted utterance element, and transmits the response information to the display apparatus 100.

Up to now, the operation of providing the response information corresponding to the user's uttered voice in the interactive system, which includes the display apparatus 100 and the interactive server 200, has been described schematically. Hereinafter, a method for providing response information corresponding to a user's uttered voice in the interactive system which includes the display apparatus 100 and the interactive server 200 will be explained schematically.

Figure 3:
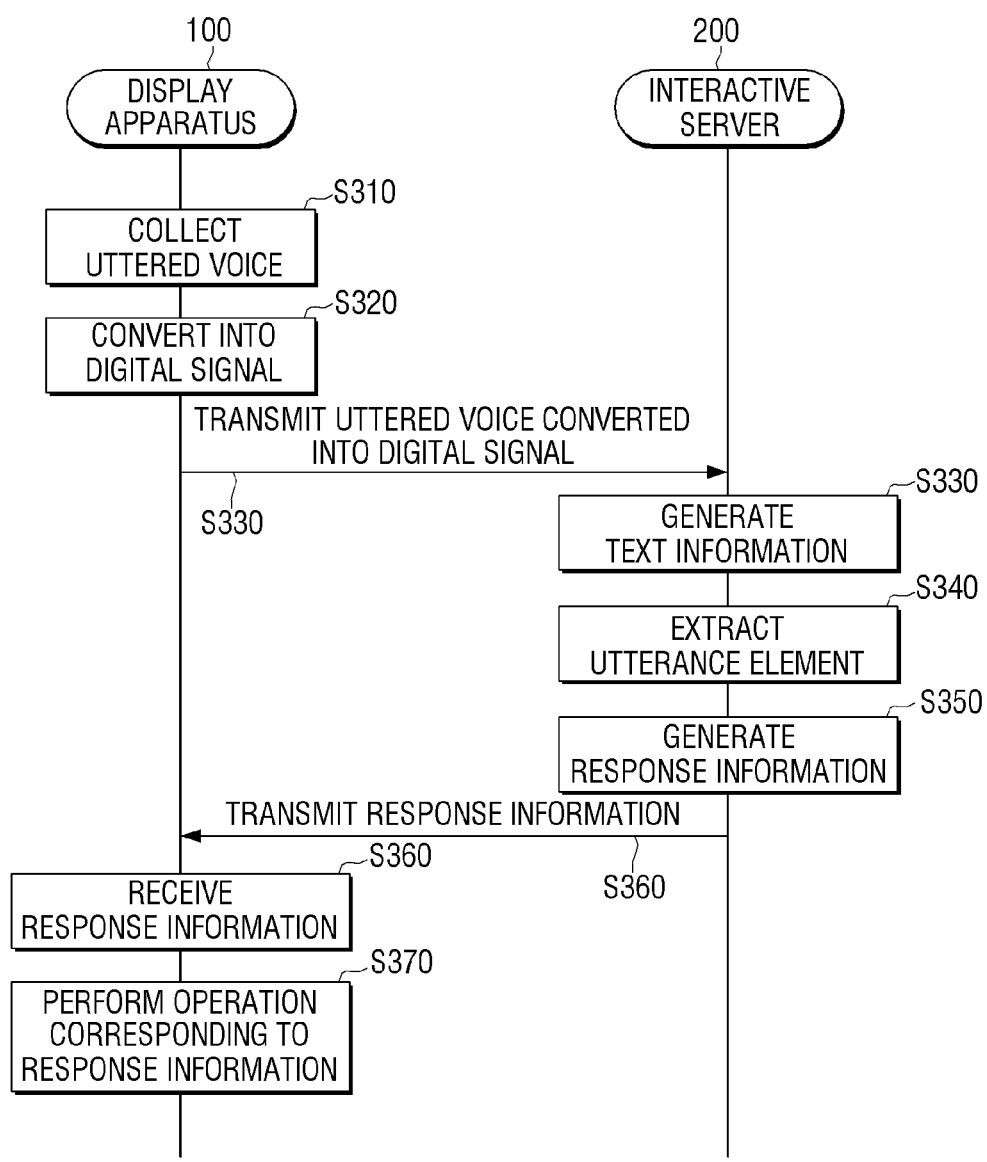
FIG. 3 is a first flowchart illustrating a method for providing response information appropriate to a user's uttered voice in an interactive system according to an exemplary embodiment.

FIG. 3 is a first flowchart illustrating a method for providing response information appropriate to a user's uttered voice in an interactive system according to an exemplary embodiment.

As explained above in FIG. 1, the interactive system may include a display apparatus 100 and an interactive server 200. In this case, the display apparatus 100 collects a voice uttered by a user (operation S310) as shown in FIG. 3. The collected voice is an analog signal. Accordingly, the display apparatus 100 converts the collected voice into a digital signal (operation S320). After that, the display apparatus 100 transmits the user's uttered voice which has been converted into the digital signal to the interactive server 200 (operation S230). Specifically, if a mode to collect a user's voice is initiated, the display apparatus 100 collects a user's uttered voice located within a predetermined distance of the display apparatus, converts the collected voice into a digital signal, and transmits the converted voice to the interactive server 200.

To achieve this, the display apparatus 100 may include a microphone to receive the user's uttered voice. In this case, the microphone may be embedded in the display apparatus 100 or may be mounted on a remote controller to control the display apparatus 100. However, this should not be considered as limiting and the microphone may have a form that can be grasped by user's hand separately from the remote controller or may have a form that can be placed on a table.

If the uttered voice is received from the display apparatus 100, the interactive server 200 generates text information regarding the uttered voice, analyzes the text information, and extracts an utterance element from the uttered voice (operations S330 and S340). The utterance element may be a keyword to perform an operation requested by the user in the user's uttered voice. For example, if the user's uttered voice is "What time will the program ooo be aired this Saturday?", the utterance elements may be "this Saturday", "ooo (program title)", "what time", and "aired".

If such an utterance element is extracted, the interactive server 200 generates response information for performing an operation corresponding to the user's uttered voice based on the extracted utterance element, and transmits the response information to the display apparatus (operations S350 and S360). Accordingly, the display apparatus 100 receives the response information from the interactive server 200 and performs an operation corresponding to the user's uttered voice based on the response information (operations S360 and S370). The response information may include at least one of a control command to control the function of the display apparatus 100 and information for outputting a response message in response to the uttered voice which is collected by the display apparatus 100 (hereinafter, referred to as a response message).

For example, if a user's uttered voice saying "Please record the program ooo (program title) which airs this Saturday" is received, the interactive server 200 generates response information including a control command to schedule a recording of the program ooo at a time when the program airs, and a response message saying "The recording of the program ooo has been scheduled", based on the utterance element of the uttered voice, and transmits the response information to the display apparatus 100.

Accordingly, the display apparatus 100 schedules the recording of the corresponding program and also outputs the response message saying "The recording of the program ooo has been scheduled" as a voice or an image of a text format based on the response information.

As explained above with reference to FIG. 2, the interactive server 200 may include a first server 10 and a second server 20. Hereinafter, a method for providing response information corresponding to a user's uttered voice in an interactive system, which includes a display apparatus 100 and an interactive server 200 which includes a first server 10 and a second server 20 will be explained schematically.

Figure 4:
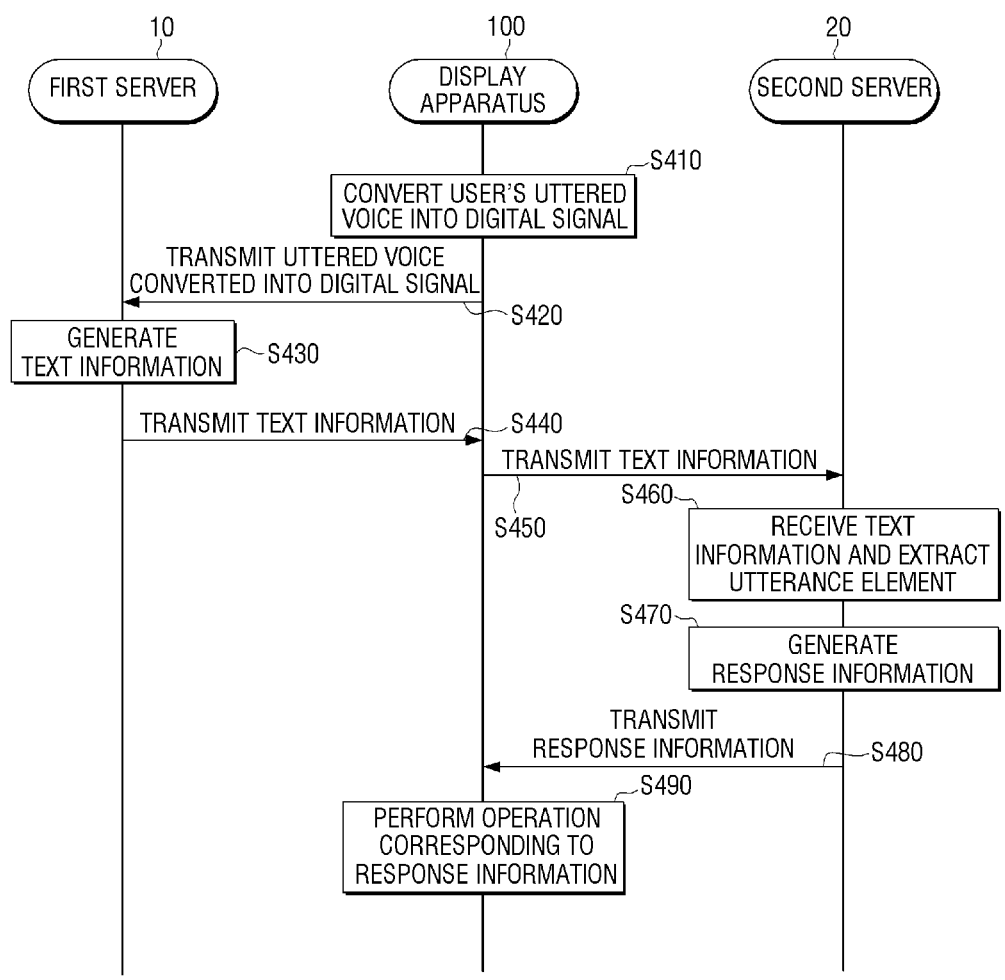
FIG. 4 is a second flowchart illustrating a method for providing response information appropriate to a user's uttered voice in an interactive system according to another exemplary embodiment.

FIG. 4 is a second flowchart illustrating a method for providing response information appropriate to a user's uttered voice in an interactive system according to another exemplary embodiment.

As explained above with reference to FIG. 2, the interactive system can provide response information appropriate to a user's uttered voice by means of the display apparatus 100 and the interactive server 200 including the first server 10 and the second server 20.

As shown in FIG. 4, the display apparatus 100 collects a voice uttered by a user and then converts the user's uttered voice into a digital signal (operation S410). The collected voice is an analog signal. Accordingly, if the user's uttered voice is collected, the display apparatus 100 converts the uttered voice of the analog signal into a digital signal. Specifically, if a mode to collect a user's voice is initiated, the display apparatus 100 collects a user's uttered voice located within a predetermined distance, converts the collected voice into a digital signal, and transmits the converted voice to the first server 10. To achieve this, the display apparatus 100 may include a microphone to receive the user's uttered voice. In this case, the microphone may be embedded in the display apparatus 100 or may be mounted on a remote controller for controlling the display apparatus 100. However, this should not be considered as limiting and the microphone may have a form that can be grasped by user's hands separately from the remote controller or may have a form that can be placed on a table.

If the user's uttered voice is converted into the digital signal, the display apparatus 100 transmits the user's uttered voice, which has been into the digital signal, to the first server 10 (operation S420). The first server 10, which has received the user's uttered voice converted into the digital signal, generates text information regarding the user's uttered voice according to a specific pre-stored pattern regarding a variety of uttered voices (operation S430). After that, the first server 10 transmits the text information regarding the user's uttered voice (operation S440), and the display apparatus 100 transmits the text information regarding the user's uttered voice, which has been received from the first server 10, to the second server 20 (operation S450). The second server 20, which has received the text information regarding the user's uttered voice, analyzes the text information and extracts an utterance element of the user's uttered voice (operation S460).

The utterance element may be a keyword to perform an operation requested by the user in the user's uttered voice. For example, if the user's uttered voice is "What time will the program ○○○ be aired this Saturday?", the utterance element may be "this Saturday", "○○○" (program TITLE), "what time", and "aired".

If such an utterance element is extracted, the second server 20 generates response information for performing an operation corresponding to the user's uttered voice based on the extracted utterance element, and transmits the response information to the display apparatus 100 (operations S470 and S480). Accordingly, the display apparatus 100 receives the response information from the interactive server 200, and performs the operation corresponding to the user's uttered voice based on the response information (operation S490). The response information may include at least one of a control command to control the function of the display apparatus 100 and information for outputting a response message in response to the voice collected in the display apparatus 100 (hereinafter, referred to as a response message).

For example, if the user's uttered voice saying "Please record the program ○○○ (program title) which airs this Saturday" is received, the interactive server 200 extracts an utterance element from the uttered voice, generates response information including a control command to schedule a recording of the program ○○○ at a time when this program airs and a response message saying "The recording of the program ○○○ has been scheduled", based on the extracted utterance elements, and transmits the response information to the display apparatus 100. Accordingly, the display apparatus 100 schedules the recording of the program and also outputs the response message saying "The recording of the program ○○○ has been scheduled" as a voice or an image of a text format, based on the response information.

Up to now, the method for providing the response information appropriate to the user's uttered voice in the interactive system has been described. Hereinafter, elements of the display apparatus 100 and the interactive server 200 described above will be explained in detail.

Figure 5:
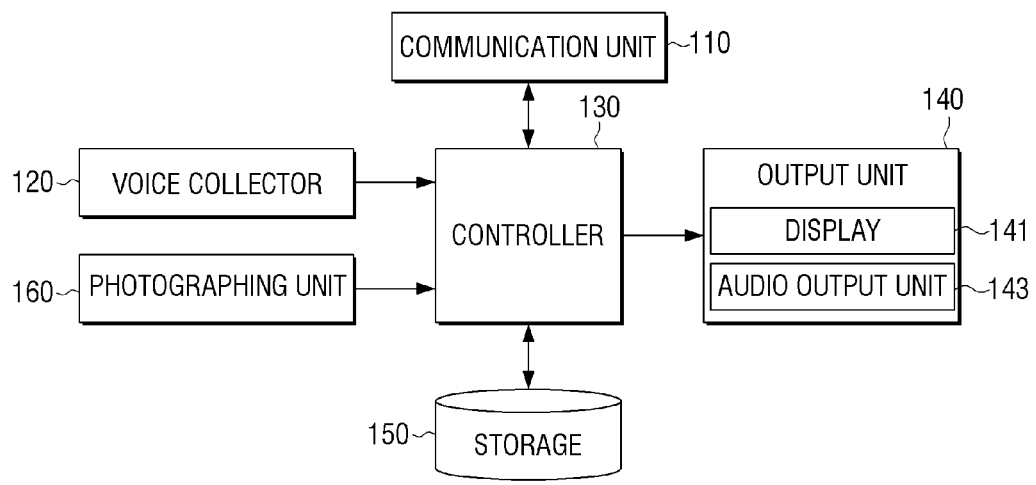
FIG. 5 is a block diagram illustrating a display apparatus according to an exemplary embodiment.

FIG. 5 is a block diagram illustrating a display apparatus according to an exemplary embodiment.

As shown in FIG. 5, a display apparatus 100 includes a communication unit 110, a voice collector 120, a controller 130, and an output unit 140.

The communication unit 110 communicates with an interactive server 200 which provides response information appropriate to a user's uttered voice. Specifically, the communication unit 110 communicates with the interactive server 200 in various communication methods and transmits a user's uttered voice to the interactive server 200. To achieve this, the communication unit 110 may include various communication modules such as a local area wireless communication module (not shown) and a wireless communication module (not shown). The local area wireless communication module (not shown) is a communication module that wirelessly communicates with an external apparatus located within a short distance, and may be Bluetooth or Zigbee, for example. The wireless communication module (not shown) is a module that is connected to an external network for communication according to a wireless communication protocol such as WiFi and IEEE. In addition to these, the wireless communication module may further include a mobile communication module that is connected to a mobile communication network according to various mobile communication standards such as $3^{rd}$ Generation (3G), $3^{rd}$ Generation Partnership Project (3GPP), and long term evolution (LTE).

The voice collector 120 processes the collected voice and generates a user voice signal. That is, the voice collector 120 may remove noise (for example, noise from an air conditioner or a vacuum cleaner, or a musical sound) from the collected voice, and may generate the user voice signal. Specifically, if a user's uttered voice of an analog format is input, the voice collector 120 samples the uttered voice and converts it into a digital signal. At this time, the voice collector 120 determines whether the uttered voice which has been converted into the digital signal contains noise or not, and, if there is noise, removes the noise from the digital signal. As described above, if the user's uttered voice is converted into the digital signal through the voice collector 120, the communication unit 110 transmits the user's uttered voice which has been converted into the digital signal to the interactive server 200. As described above, the interactive server 200 may include a first server 10 to generate text information regarding the user's uttered voice and a second server 20 to generate response information corresponding to the user's uttered voice based on the text information. Accordingly, if the user's uttered voice is converted into the digital signal by the voice collector 120, the communication unit 110 transmits the converted digital signal to the first server 10, and, if the user's uttered voice converted into the text information is received from the first server 10, the communication unit 110 transmits the user's uttered voice to the second server 20.

However, this should not be considered as limiting. The interactive server 200 may be a single server, and may generate text information regarding the user's uttered voice and may generate response information corresponding to the user's uttered voice based on the text information. In the present exemplary embodiment, the interactive server 200 comprises the server 200 which includes the first server 10 and the second server 20.

If the response information corresponding to the user's uttered voice which has been converted into the text information is received from the second server 20, the controller 130 controls to perform an operation corresponding to the user's uttered voice based on the response information. Specifically, if the user's uttered voice is input, the controller 130 converts the user's uttered voice into the digital signal through the voice collector 120. After that, the controller 130 transmits the user's uttered voice which has been converted into the digital signal to the first server 10 through the communication unit 110, and receives the text information regarding the user's uttered voice from the first server 10. If the text information regarding the user's uttered voice is received from the first server 10, the controller 130 transmits the user's uttered voice which has been converted into the text information to the second server 20 through the communication unit 110, and receives the response information corresponding to the user's uttered voice.

The output unit 140 outputs at least one of a voice and an image. Specifically, if the response information corresponding to the user's uttered voice is received from the second server 20, the output unit 140 may output a response message regarding the user's uttered voice as a voice or an image of a text format based on the received response information, according to a control command of the controller 130. To achieve this, the output unit 140 may include a display 141 and an audio output unit 143.

Specifically, the display 141 may be realized by a liquid crystal display (LCD), an organic light emitting diode (OLED), or a plasma display panel (PDP), and may provide various display screens provided by the display apparatus 100. In particular, the display 141 may display the response message corresponding to the user's uttered voice in a format of a text or an image. The display 141 may be realized by a touch screen which forms a layered configuration along with a touch pad, and the touch screen may be configured to detect a touch input location, an area, and a pressure of touch input. However, the configuration of the display is not limited thereto.

The audio output unit 143 may be realized by an output port such as a speaker or a jack, and may output the response message regarding the user's uttered voice in a voice format.

As described above, the response information received from the second server 20 may be generated in a different form according to a function classified based on the utterance element extracted from the user's uttered voice. The function classified based on the extracted utterance element may include at least one of an EPG-related function and an operation control-related function of the display apparatus 100. For example, if the utterance element extracted from the user's uttered voice is associated with a broadcast program, the function is the EPG-related function, and, if the utterance element is associated with power on/off, channel change, or volume change of the display apparatus 100, the function is the operation control-related function of the display apparatus 100.

Accordingly, if the response information is received from the second server 20, the controller 130 may control to perform the operation corresponding to the user's uttered voice based on the response information.

For example, if an uttered voice saying "Please change the channel to MBC" is input from the user, the controller 130 converts the uttered voice saying "Please change the channel to MBC" into a digital signal through the voice collector 120, and transmits the converted voice to the first server 10. After that, if text information regarding the uttered voice saying "Please change the channel to MBC" is received from the first server 10, the controller 130 transmits the text information regarding the uttered voice saying "Please change the channel to MBC" to the second server 20.

Accordingly, the second server 20 extracts utterance elements, "MBC", "channel", and "change" from the text information regarding the uttered voice saying "Please change the channel to MBC", and determines that the uttered voice is about the operation control-related function of the display apparatus 100 based on the extracted utterance elements. After that, the second server 20 transmits response information including a control command to change the channel and a response message saying "The channel has been changed to MBC" to the display apparatus 100.

Accordingly, the controller 130 changes a current channel to the MBC according to the control command included in the response information. The controller 130 controls the output unit 140 to output the response message saying "The channel has been changed to MBC" though at least one of an image and a voice based on the response message included in the response information. Accordingly, the response message saying "The channel has been changed to MBC" may be output through the audio output unit 143 as a voice or may be output through the display 141 as an image of a text format.

As another example, if an uttered voice saying "Please record the program ○○○ which airs today" is input from the user, the controller 130 converts the uttered voice saying "Please record the program ○○○ (program title) which airs today" into a digital signal through the voice collector 120 and transmits the uttered voice to the first server 10. After that, if text information regarding the uttered voice saying "Please record the program ○○○ (program title) which airs today" is received from the first server 10, the controller 130 transmits the text information regarding the uttered voice saying "Please record the program ○○○ (program title) which airs today" to the second server 20.

Accordingly, the second server 200 extracts utterance elements, "today", "program ○○○ (program title)", and "record" from the text information regarding the uttered voice saying "Please record the program ○○○ (program title) which airs today", and determines that the uttered voice is about the EPG-related function based on the extracted utterance elements. After that, the second server 20 transmits response information including a control command to schedule a recording of the program ○○○ (program title) and a response message saying "The recording of the program ○○○ has been scheduled" to the display apparatus 100.

The controller 140 schedules the recording of the program ○○○ according to the control command included in the response information. The controller controls the output unit 140 to output the response message saying "The recording of the program ○○○ has been scheduled" through at least one of an image and a voice based on the response message included in the response information. Accordingly, the response message saying "The recording of the program ○○○ has been scheduled" may be output through the audio output unit 143 as a voice or may be output through the display 141 as an image of a text format.

As described above, the controller 130, which performs the operation corresponding to the user's uttered voice based on the response information received from the second server 20, may receive a voice re-request message regarding the user's uttered voice from the second server 20 and may output the voice re-request message through the output unit 140.

According to an exemplary embodiment, if the utterance element extracted from the user's uttered voice does not satisfy a predetermined condition, the controller 130 receives a voice re-request message regarding the user's uttered voice from the second server 20 and outputs the voice re-request message through the output unit 140.

For example, the second server 20 may receive text information regarding an uttered voice saying "Please schedule the 9 o'clock news for watching" from the display apparatus 100. In this case, the second server 20 may transmit response information including a voice re-request message saying "Is it the 9 o'clock news of KBS or MBC?" to the display apparatus 100, based on an utterance element extracted from the text information regarding the uttered voice saying "Please schedule the 9 o'clock news for watching". That is, the second server 20 determines whether the extracted utterance element satisfies the predetermined condition or not, and, if not, generates response information including a voice re-request message to satisfy the predetermined condition, and transmits the response information to the display apparatus 100.

The controller 130 controls the display 141 and the audio output unit 143 to output the message saying "Is it the 9 o'clock news of KBS or MBC?" through at least one of an image and a voice based on the voice re-request message included in the response information. Accordingly, the controller 130 may receive an additional voice corresponding to the voice re-request message output through the display 141 and the audio output unit 143 from the user. For example, if a voice saying "the MBC 9 o'clock news" is additionally input from the user, the controller 130 transmits text information regarding the uttered voice saying "the MBC 9 o'clock news" to the second server 20. If the predetermined condition is satisfied by the text information regarding the additionally uttered voice, the second server 20 transmits response information including a control command to change the channel scheduling to the "MBC 9 o'clock news" and a response message saying "The MBC 9 o'clock news has been scheduled for watching" to the display apparatus 100.

Accordingly, the controller 130 changes the channel scheduling to the MBC 9 o'clock news according to the control command included in the response information. The output unit 140 outputs the response message saying "The MBC 9 o'clock news has been scheduled for watching" through the audio output unit 143 as a voice or through the display 141 as an image of a text format according to the control command of the controller 130.

According to another exemplary embodiment, if an utterance element regarding a plurality of requests is included in the user's uttered voice, the controller 130 receives a voice re-request message regarding the user's uttered voice from the second server 20, and outputs the voice re-request message through the output unit 140.

For example, the second server 20 may receive text information regarding a voice saying "Please schedule the program ○○○ which airs this week, for watching, and please record the program ○○○", from the display apparatus 100. In this case, utterance elements regarding a plurality of requests ("program ○○○ (program title)" and "schedule for watching", and "program ○○○ (program title)" and "record") are included in the uttered voice saying" "Please schedule the program ○○○ which airs this week, for watching, and please record the program ○○○".

Accordingly, the second server 20 determines that the utterance elements regarding the plurality of requests are included in the text information regarding the uttered voice, and transmits response information including a voice re-request message to the display apparatus 100. The controller 130 outputs the voice re-request message through the display 141 and the audio output unit 143 of the output unit 140 through at least one of an image and a voice. If the voice re-request message is output through at least one of the image and the voice, the user may re-request by saying only one "Please schedule the program ○○○ (program title) which airs this week, for watching", or "Please record the program ○○○ (program title) which airs this week".

The controller 130 may receive an uttered voice having nothing to do with the EPG-related function or the operation control-related function of the display apparatus 100.

For example, if an uttered voice saying "Please let me know any restaurant nearby" is input from the user, the controller 130 transmits text information regarding the uttered voice saying "Please let me know any restaurant nearby" received from the first server 10 to the second server 20. The second server 20, which has received the text information regarding the uttered voice, extracts utterance elements, "nearby" and "restaurant" from the text information regarding the uttered voice saying "Please let me know any restaurant nearby", and determines that the extracted utterance elements have nothing to do with the EPG-related function or the operation control-related function of the display apparatus 100. Accordingly, the second server 200 transmits alternative response information saying "Alternative information is available through the Internet, do you wish to receive it?" to the display apparatus 100. Such alternative response information may include the utterance elements extracted from the uttered voice.

If the alternative response information is received, the controller 130 outputs the response message saying "Alternative information is available through the Internet, do you wish to receive it?" through at least one of an image and a voice according to the alternative response information received from the second server 20. That is, the controller 130 controls the display 141 and the audio output unit 143 to output the alternative information included in the response information through at least one of an image and a voice.

After that, if a voice that the user wishes to receive the alternative information through a web is input from the user, the controller 130 performs an Internet search based on the utterance element included in the alternative response information, and obtains alternative information regarding the restaurants located in a close distance from the location of the display apparatus 100.

However, this should not be considered as limiting. The second server 20 may be interlocked with an Internet server (not shown). Accordingly, as described above, if the extracted utterance elements have nothing to do with the EPG-related function or the operation control-related function of the display apparatus 100, the second server 200 transmits the alternative response information saying "Alternative information is available through the Internet, do you wish to receive it?" to the display apparatus 100. After that, if the voice that the user wishes to receive the alternative information through the Internet is received from the display apparatus 100, the second server 20 obtains the alternative information regarding the user's uttered voice through an Internet server (not shown) based on the extracted utterance element, and transmits the alternative information to the display apparatus 100.

If such alternative information is obtained or received from the second server 20, the controller 130 controls the display 141 and the audio output unit 143 to output the alternative information through at least one of an image and a voice. Accordingly, the user can identify where he/she is and the restaurants located nearby based on the alternative information output through the display 141 and the audio output unit 143.

If a prohibited utterance element is included in the uttered voice, the controller 130 may control the output unit 140 to output a disallowed message regarding the operation corresponding to the uttered voice based on the response information received from the second server 20.

For example, if an uttered voice containing a profanity or a prohibited drug is input from the user, the controller 130 receives text information regarding the user's uttered voice from the first server 10 and transmits the text information to the second server 20. The second server 20, which has received the text information regarding the user's uttered voice, extracts an utterance element from the text information regarding the uttered voice, and checks whether the extracted utterance element is a prohibited utterance element, which is pre-stored or not. As a result of the checking, if the extracted utterance element is the prohibited utterance element, the second server 20 transmits response information including a disallowed message regarding the operation corresponding to the uttered voice to the display apparatus 100.

Accordingly, the controller 130 controls the output unit 140 to output a disallowed message saying "The request is refused" through at least one of an image and a voice according to the response information. Accordingly, the disallowed message saying "The request is refused" may be output through the audio output unit 143 as a voice or may be output through the display 141 as an image of a text format.

However, this should not be considered as limiting. If the uttered voice contains the profanity or the prohibited drug, the controller 130 may determine whether to perform an operation corresponding to the uttered voice or not with reference to a pre-stored table in the storage 150 regarding an utterance element. The pre-stored table in the storage 150 regarding the utterance element is a table that is pre-set by the user to suppose an operation corresponding to the user's uttered voice. For example, if the user's uttered voice includes an utterance element "drug" and the utterance element is recorded on the table stored in the storage 150 regarding the utterance element, the controller 130 may output a disallowed message saying "The request is refused" through at least one of the display 141 and the audio output unit 143.

If the utterance element "drug" is not recorded on the table regarding the utterance element, the controller 130 transmits the text information regarding the user's uttered voice to the second server 20. Accordingly, the controller 130 receives response information including the disallowed message regarding the operation corresponding to the uttered voice from the second server 20 and may output the disallowed message saying "The request is refused" through at least one of the display 141 and the audio output unit 143 as an image and a voice, as described above.

The display apparatus 100 may further include a photographing unit to photograph a user's face. The storage 150 may store a user's face image and user information by matching them.

Accordingly, if a facial image is generated by the photographing unit 160, the controller 130 obtains user information matched with the generated facial image from the storage 150, and may transmit the user information and the text information regarding the user's uttered voice to the second server 20. According to an exemplary embodiment, if an utterance element associated with a user age is included in the user's uttered voice, the controller 130 may control the output unit 140 to output a disallowed message regarding the operation corresponding to the uttered voice according to the response information generated based on the user information.

For example, if an uttered voice regarding change to an adult broadcast channel is input from the user, the controller 130 receives text information regarding the user's uttered voice from the first server 10, and transmits the text information to the second server 20. At this time, the controller 130 extracts user information matched with a facial image photographed by the photographing unit 160 from the storage 150, and transmits the user information to the second server 20. The second server 20, which has received the text information regarding the user's uttered voice and the user information, extracts an utterance element from the text information regarding the uttered voice, and checks whether the extracted utterance element is recorded on a pre-stored table regarding a user age limit utterance element or not. As a result of the checking, if the extracted utterance element is an utterance element associated with a user's age limit, the second server 20 checks whether the user meets the age limit or not based on the user information. As a result of the checking, if the user is not authorized to watch the adult broadcast channel requested by the user, the second server 20 transmits response information including a disallowed message regarding the operation corresponding to the user's uttered voice to the display apparatus 100.

Accordingly, the controller 130 controls the output unit 140 to output the disallowed message saying "The request is refused" through at least one of an image and a voice according to the response information. Accordingly, the disallowed message saying "The request is refused" may be output through at least one of the display 141 and the audio output unit 143 as an image of a text format and a voice.

However, this should not be considered as limiting. If an uttered voice regarding change to an adult broadcast channel is input from the user, the controller 130 checks whether the user meets an age limit or not based on user information matched with a face image photographed by the photographing unit 160. As a result of the checking, if the user is not authorized to watch the adult broadcast channel requested by the user, the controller 130 controls the output unit 140 to output a disallowed message saying "The request is refused" through at least one of an image and a voice. Accordingly, the disallowed message saying "The request is refused" may be output through at least one of the display 141 and the audio output unit 143 as an image of a text format and a voice.

Hereinafter, the above-described display apparatus 100 will be described in detail.

Figure 6:
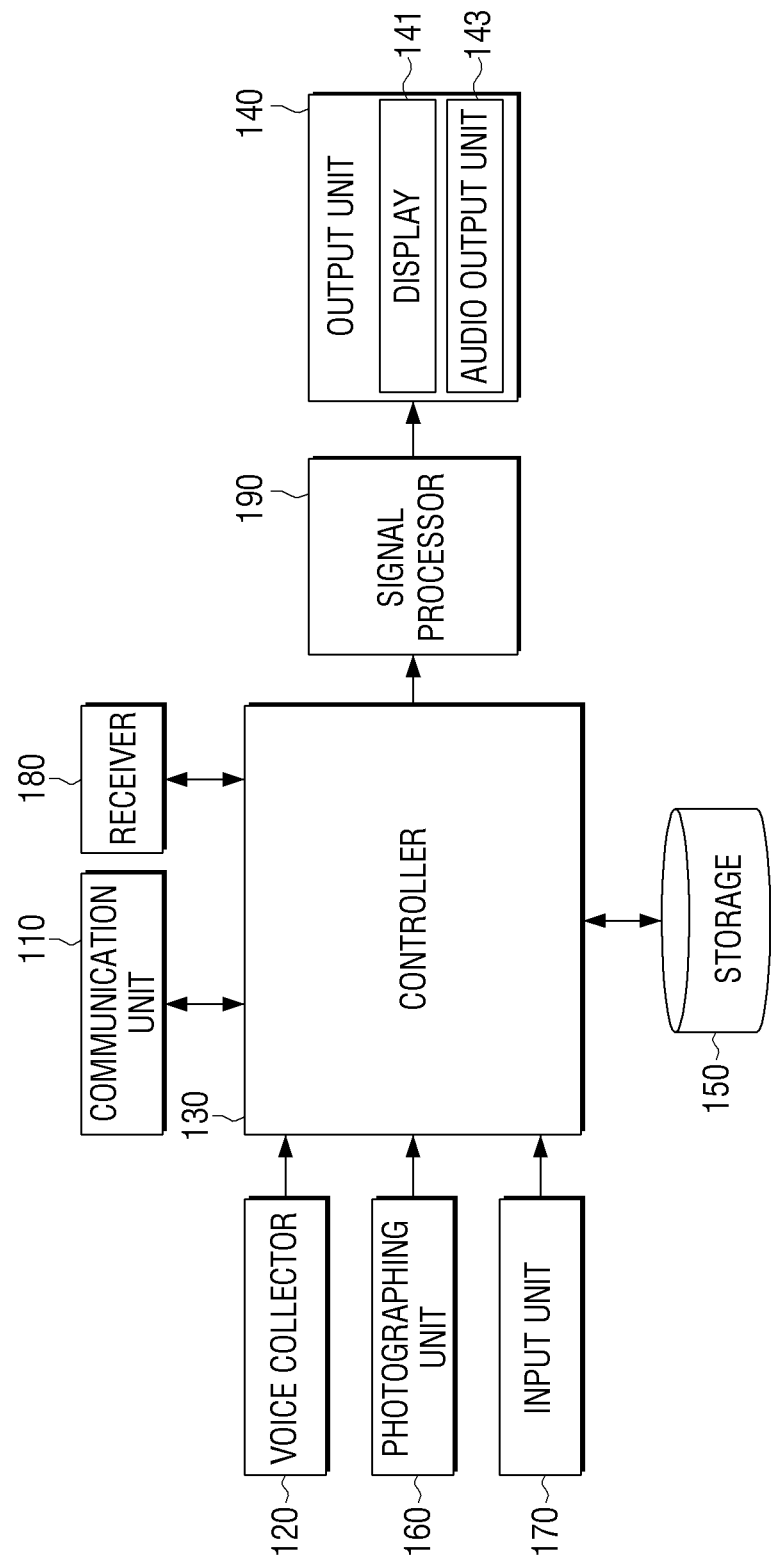
FIG. 6 is a block diagram illustrating a display apparatus in detail according to an exemplary embodiment.

FIG. 6 is a block diagram illustrating a display apparatus in detail according to an exemplary embodiment.

As shown in FIG. 6, the display apparatus 100 may further include an input unit 170, a receiver 180, and a signal processor 190 in addition to the elements shown in FIG. 5. The same elements as those of FIG. 5 have the same functions and thus a detailed description thereof is omitted.

The input unit 170 is an inputting means for receiving a variety of user manipulations and transmitting them to the controller 130, and may be realized by an input panel. The input panel may be realized by a touch pad, a keypad provided with various function keys, number keys, special keys, and character keys, or a touch screen. Also, the input unit 170 may be realized by an infrared ray (IR) receiver (not shown) to receive a remote control signal transmitted from a remote controller for controlling the display apparatus 100. However, the input panel is not limited to these examples.

The input unit 170 may receive a variety of user manipulations to control a function of the display apparatus 100 according to the type of display apparatus 100. For example, if the display apparatus 100 is a smart television (TV), the input unit 170 may receive a user manipulation to control functions of the smart TV such as power on/off, channel change, and volume change. If such a user manipulation is input through the input unit 170, the controller 130 may control other elements to perform various functions corresponding to the user manipulation input through the input unit 170. For example, if a power off command is input, the controller 130 may shut off the power supplied to the elements of the display apparatus 100, and if a channel change command is input, the controller 130 may control the receiver 180 to tune to a selected channel according to the user manipulation.

The input unit 170 receives a user command to initiate a voice recognition mode to collect a user's voice. If the user command to initiate the voice recognition mode is input through the input unit 150, the controller 130 activates the voice collector 120 to collect a user voice uttered within a predetermined distance of the display apparatus.

The storage 150 described above is a storage medium that stores a variety of programs necessary for operating the display apparatus 100, and may be realized by a memory or a hard disk drive (HDD) but is not limited thereto. For example, the storage 150 may include a read only memory (ROM) to store a program for performing an operation of the controller 130, and a random access memory (RAM) to temporarily store data generated by the operation of the controller 130. The storage 150 may further include an electronically erasable and programmable ROM (EEPROM) to store various reference data.

In particular, the storage 150 may store various response messages appropriate to the user's uttered voice as voice or text information. Accordingly, the controller 130 may read out voice information or text information regarding a response message appropriate to the user's uttered voice from the storage 150, and may output the voice information and the text information through at least one of the display 141 and the audio output unit 143. Specifically, if the response message appropriate to the user's uttered voice is output in a voice form, the controller 130 performs signal processing such as decoding with respect to the voice information read out from the storage 150, amplifies the decoded voice data, and outputs the voice data through the audio output unit 143. Also, if the response message appropriate to the user's uttered voice is output as an image of a text format, the controller 130 performs signal processing such as decoding with respect to the text information read out from the storage 150, generates a user interface (UI) screen including texts constituting the text information, and outputs the UI screen through the display 141.

However, this should not be considered as limiting. The controller 130 may perform the above-described processing operation with respect to the response message included in the response information received from the second server 20, and outputs the response message through at least one of the display 141 and the audio output unit 143 as a text image or a voice.

The receiver 180 receives content of a broadcast program through a broadcast network. Specifically, the receiver 180 may receive content from a broadcasting station which broadcasts content of a broadcast program through a broadcast network, or from an Internet server which transmits content files through the Internet. Also, the receiver 180 may receive the content from a variety of recording medium reproducing apparatuses provided in the display apparatus 100 or connected to the display apparatus 100. The recording medium reproducing apparatus reproduces contents recorded on a variety of recording media such as a CD, a DVD, a hard disk, a Blue-ray disk, a memory card, and a USB memory.

The receiver 180 may include a tuner (not shown), a demodulator (not shown), and an equalizer (not shown) in case that the content is received from the broadcasting station. The receiver 180 may be a network interface card (not shown) if content is received from a source apparatus such as an Internet server. Also, the receiver 180 may be an interface unit (not shown) connected to a recording medium reproducing apparatus if content is received from a variety of recording medium reproducing apparatuses. As described above, the receiver 180 may be realized in various ways according to exemplary embodiments.

The signal processor 190 performs signal processing with respect to the content received through the receiver 180 so that the content can be output through the output unit 140. Specifically, the signal processor 190 performs signal processing such as decoding, scaling, and frame rate conversion with respect to a video signal included in the content so that the video signal can be output from the display 141. Also, the signal processor 180 performs signal processing such as decoding with respect to an audio signal included in the content so that the audio signal can be output through the audio output unit 143. Accordingly, the display 141 and the audio output unit 143 may output the video signal and the audio signal included in the content signal-processed by the signal processor 190.

The operation of receiving the response information appropriate to the user's uttered voice through the interactive server 200 and performing the corresponding operation in the display apparatus 100 has been described in detail. Hereinafter, an operation of generating response information appropriate to a user's uttered voice received through the display apparatus 100 and transmitting the response information to the display apparatus 100 from the interactive server 200 will be explained in detail.

Figure 7:
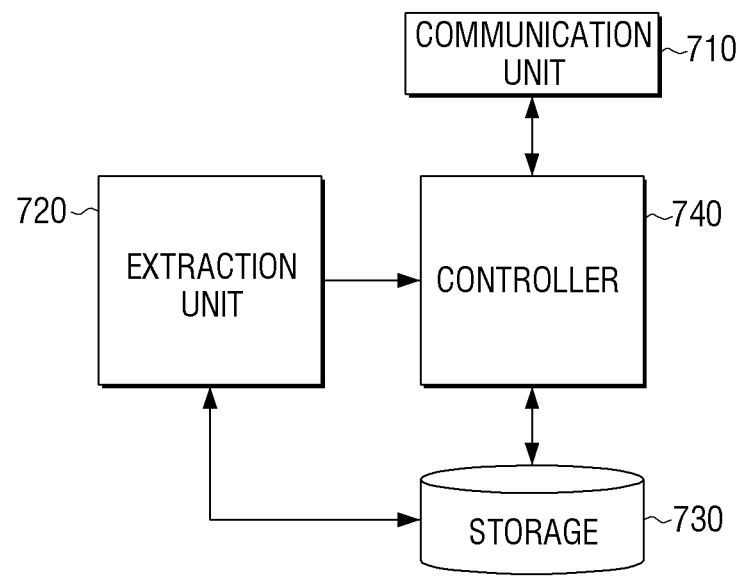
FIG. 7 is a block diagram illustrating an interactive server according to an exemplary embodiment.

FIG. 7 is a block diagram illustrating an interactive server according to an exemplary embodiment.

The interactive server explained in FIG. 7 is the above-described second server 20, and receives a user's uttered voice which has been converted into text information through the first server 10 from the display apparatus 100, extracts an utterance element from the text information regarding the user's uttered voice, and transmits response information appropriate to the user's uttered voice to the display apparatus 100. Such an interactive server includes a communication unit 710, an extraction unit 720, a storage 730, and a controller 740.

The communication unit 710 communicates with the display apparatus 100, and the extraction unit 720 extracts an utterance element from the uttered voice received from the display apparatus 100 through the communication unit 710. The storage 730 records conversation history information of each of the user's uttered voices and stores EPG information. The controller 740 generates response information corresponding to the user's uttered voice in a different form based on a function which is classified according to the utterance element extracted by the extraction unit 720 on the user's uttered voice. The function classified according to the utterance element may include at least one of an EPG-related function and a function of controlling an operation of the display apparatus 100. Accordingly, the controller 740 determines whether the user's uttered voice pertains to the EPG, or to control the operation of the display apparatus 100 according to the utterance element extracted from the user's uttered voice, and generates response information corresponding to the user's uttered voice according to a result of the determining.

According to an exemplary embodiment, if the utterance element extracted from the user's uttered voice pertains to the EPG, the controller 740 determines whether EPG information corresponding to the user's uttered voice is available based on the EPG information pre-stored in the storage 730. As a result of the determining, if the EPG information is available, the controller 740 generates response information corresponding to the user's uttered voice based on the EPG information. If the EPG information is not available, the controller 740 generates alternative response information regarding the user's uttered voice based on at least one of EPG information pre-defined in the storage 730 and an Internet search.

Specifically, if text information regarding the user's uttered voice is received, the extraction unit 720 may extract an utterance element including a dialog act, a main goal, and a key element from the text information. The dialog act is a label indicating an illocutionary force regarding a user's uttered voice. For example, the dialog act may be a statement, a request, or a question. The main goal is a label indicating a user's real intention from a user's uttered voice, and may be TV on/off, a program search, a program time search, or program scheduling. The key element may be a genre, a program title, a time, a channel name, or an actor's name.

For example, if the user's uttered voice is "What time does the program ○○○ (program title) start?", the dialog act may indicate the interrogative expression including a question mark "?", and the main goal may be a program time search because of the word "start". The key element may be the program name ○○○ (program title).

Accordingly, if the text information regarding the user's uttered voice is "What time does the program ○○○ (program title) start?", the extract unit 720 extracts the utterance element including the dialog act, the main goal, the key element. If such an utterance element is extracted, the controller 740 determines whether or not the extracted utterance element pertains to the EPG information with reference to the EPG information stored in the storage 730. If it is determined that the utterance element extracted from the user's uttered voice pertains tot the EPG information, the controller 740 determines whether the utterance element satisfies a condition for generating response information corresponding to the user's uttered voice.

According to an exemplary embodiment, if the utterance element extracted from the user's uttered voice includes all of the dialog act, the main goal, and the key element, the controller 740 determines whether the condition for generating response information corresponding to the user's uttered voice is satisfied or not. In the above example, the utterance element extracted from the user's uttered voice saying "what time does the program ○○○ (program title) start?" includes all of the dialog act, the main goal, and the key element. In this case, the controller 740 determines whether or not the condition for generating response information corresponding to the user's uttered voice is satisfied. A user's uttered voice saying "what time does it start?" includes the utterance element including only the dialog act indicating the interrogative expression including the question mark and the main goal "start", but does not include the key element. In this case, the controller 740 determines that the condition for generating response information corresponding to the user's uttered voice is not satisfied, and generates alternative response information to ask for an utterance element of a key element based on the conversation history information pre-stored in the storage 730. For example, the controller 740 may generate response information about inquiry saying "which broadcast program?".

If the condition for generating response information corresponding to the user's uttered voice is satisfied by a series of operations described above, the controller 740 determines whether or not the EPG information is available according to the utterance element extracted from the user's uttered voice based on the EPG information stored in the storage 730. As a result of the determining, if the EPG information is available according to the utterance element, the controller 740 generates response information corresponding to the user's uttered voice based on the EPG information, and, if the EPG information is not available, the controller 740 may generate alternative response information regarding the user's uttered voice.

If the user's uttered voice is "Please record the program ○○○ (program title) which airs this week", the utterance elements may be "this week", "the program ○○○ (program title)", "record", and "please". If such utterance elements are extracted, the controller 740 may obtain program information on the program ○○○ (program title) and start time information based on the EPG information stored in the storage 730. Accordingly, the controller 740 may generate response information including a control command regarding a scheduled recording of the program ○○○ based on the pre-obtained program information and time start information, and a response message generated based on the conversation history information pre-stored in the storage 730.

If the user's uttered voice is "who is the star in the program ○○○ ?", the utterance elements may be "program ○○○ (program title)", "star", and "who". If such utterance element is extracted, the controller 740 checks whether information on the star of the program ○○○ is included in the EPG information stored in the storage 730. As a result of the checking, if it is impossible to obtain the information on the star of the program ○○○ from the pre-stored EPG information, the controller 740 generates alternative response information asking whether the user wishes to receive alternative information regarding the user's uttered voice through EPG information or an Internet search. For example, if a user's voice indicating that the user wishes to receive alternative information from the EPG information is input, the controller 740 obtains information on the cast of the program ○○○ from the pre-stored EPG information. If the alternative information regarding the user's uttered voice is obtained from the EPG information, the controller 740 may generate alternative response information including the pre-obtained alternative information based on the conversation history information pre-stored in the storage 730.

If the utterance element extracted from the user's uttered voice pertains to the EPG information, the controller 740 determines whether the extracted utterance element is an EPG utterance element regarding a plurality of requests. As a result of the determining, if the utterance element is the EPG utterance element regarding a plurality of requests, the controller 740 may generate a voice re-request message to re-request an uttered voice from the user at the display apparatus 100.

For example, if the user's uttered voice is "Please record the program ○○○ (program title) which airs this week and schedule the program ΔΔΔ (program title) for watching", the utterance element may be "this week", "program ∘∘∘ (program title)", "program ΔΔΔ (program title)", "record", "watching", and "please". If such utterance elements are extracted, the controller 740 determines that the extracted utterance elements include utterance elements on a plurality of requests ("program ∘∘∘ (program title)", "program ΔΔΔ (program title)", "record", "watching"). Accordingly, the controller 740 may generate a voice re-request message saying "Please request only one" based on the conversation history information pre-stored in the storage 730.

If the utterance element extracted from the user's uttered voice is an utterance element regarding an operation control of the display apparatus 100, the controller 740 determines whether it is possible to control an operation of the display apparatus 100 corresponding to the user's uttered voice based on the extracted utterance element. As a result of the determining, if it is possible to control the operation of the display apparatus 100, the controller 740 may generate response information for controlling the operation of the display apparatus 100.

According to an exemplary embodiment, the storage 730 may store manual information for controlling the operation of the display apparatus 100. The manual information includes information for controlling the operation of the display apparatus 100 according to the user's uttered voice and information for controlling the operation of the display apparatus 100 according to other control commands except for the user's uttered voice. Accordingly, if an utterance element regarding control of the display apparatus 100 is extracted, the controller 740 determines whether or not the operation of the display apparatus 100 is controllable according to the user's uttered voice based on the manual information pre-stored in the storage 730. As a result of the determining, if the operation of the display apparatus 100 is controllable according to the user's uttered voice, the controller 740 may generate response information including a control command to perform an operation corresponding to the user's uttered voice.

For example, if the user's uttered voice is "Please change the channel to MBC", the utterance elements are "MBC", "channel", and "change". If such utterance elements are extracted, the controller 740 determines that the extracted utterance elements pertain to the control of the functions of the display apparatus 100. After that, the controller 740 determines whether it is possible to change the channel of the display apparatus 100 according to the extracted utterance element with reference to the manual information pre-stored in the storage 730. As a result of the determining, if it is possible to change the channel of the display apparatus 100 according to the user's uttered voice, the controller 740 may generate response information including a control command to change the current channel to MBC in the display apparatus 100.

As a result of the determining, if it is impossible to control the operation of the display apparatus 100 according to the user's uttered voice, the controller 740 may generate response information regarding at least one of an operation controlling method of the display apparatus 100 and a current state notification.

For example, if the user's uttered voice is "Please brighten the screen", utterance elements, "screen", "brighten", and "please" may be extracted. If such utterance elements are extracted, the controller 740 determines that the utterance elements pertain to the control of functions of the display apparatus 100. After that, the controller 740 determines whether it is possible to adjust the brightness of the screen of the display apparatus 100 according to the extracted utterance elements with reference to the manual information pre-stored in the storage 730. As a result of the determining, if it is impossible to adjust the brightness of the screen of the display apparatus 100 according to the user's uttered voice, the controller 740 may generate response information on a method for adjusting the brightness of the screen of the display apparatus 100 with reference to the manual information pre-stored in the storage 730.

According to another exemplary embodiment, the above-described storage 730 may store a table regarding a prohibited utterance element. The table regarding the prohibited utterance element may record an utterance element such as a prohibited drug or a prohibited word such as a profanity, for example. Accordingly, if the utterance element is extracted from the user's uttered voice, the controller 740 determines whether the extracted utterance element is a prohibited utterance element with reference to the table stored in the storage 730 regarding the utterance element. As a result of the determining, if the extracted utterance element is a prohibited utterance element, the storage 730 may generate a disallowed message regarding an operation corresponding to the user's uttered voice based on the conversation history information stored in the storage 730.

If the utterance element extracted from the user's uttered voice is associated with a user's age, the controller 740 may determine whether to generate a disallowed message regarding an operation corresponding to the user's uttered voice based on user information received from the display apparatus 100 through the communication unit 710. The utterance element regarding the user's age may be an utterance element regarding obscenity or violence, but is not limited thereto. For example, if the user's uttered voice is "Do you wish to change the channel to an adult broadcast channel?", utterance elements, "adult broadcast channel", "channel", "change", and "do you wish", may be extracted. If such utterance elements are extracted, the controller 740 determines that the extracted utterance elements are associated with the user's age with reference to the pre-stored table in the storage 730 regarding the prohibited utterance element. Accordingly, the controller 740 checks whether the user meets a predetermined age limit based on the user information received from the display apparatus 100.

As a result, if it is determined that the user is not authorized to watch the adult broadcast channel, the controller 740 may generate a disallowed message saying "the service is not available". On the other hand, if it is determined that the user is authorized to watch the adult broadcast channel, the controller 740 may generate response information including a control command to change the channel to a channel providing an adult broadcast service based on the EPG information stored in the storage 730.

The elements of the interactive server which provides the response information appropriate to the user's uttered voice according to the exemplary embodiments have been described in detail. Hereinafter, a method for performing an operation based on response information appropriate to a user's uttered voice in the above-described display apparatus will be explained in detail.

Figure 8:
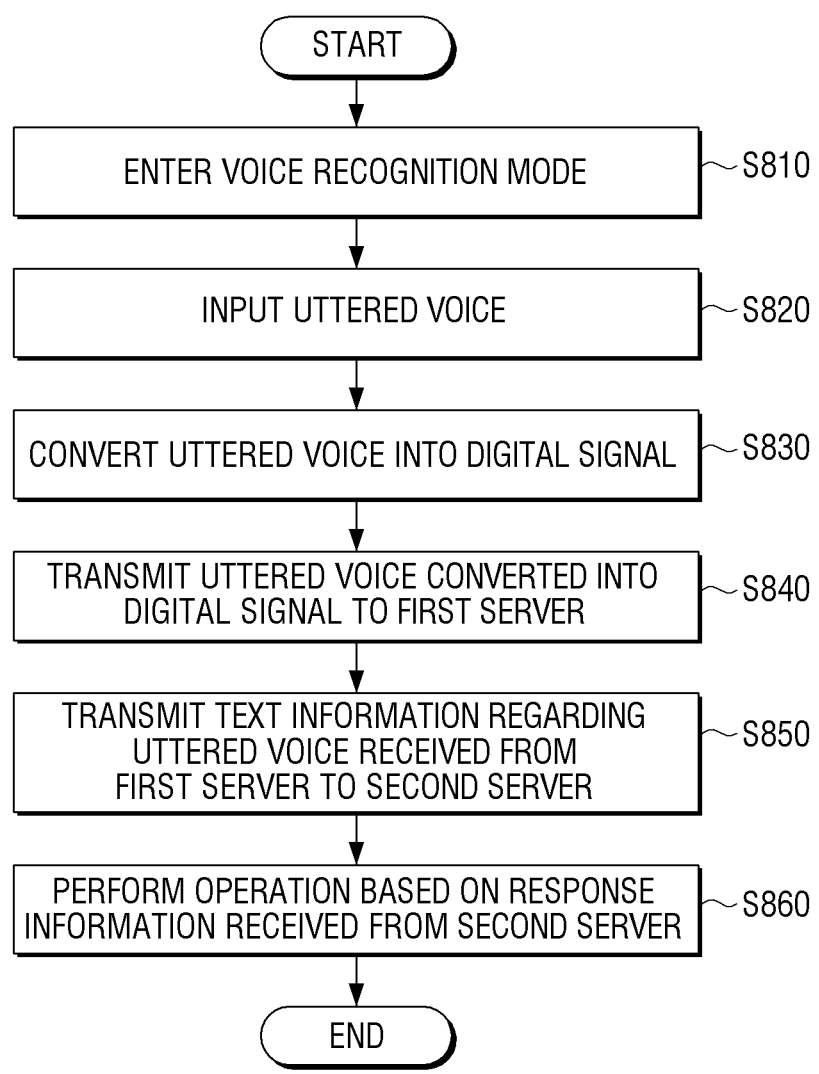
FIG. 8 is a flowchart illustrating a method for performing an operation based on response information appropriate to a user's uttered voice in a display apparatus according to an exemplary embodiment.

FIG. 8 is a flowchart illustrating a method for performing an operation based on response information appropriate to a user's uttered voice in a display apparatus according to an exemplary embodiment.

As shown in FIG. 8, if a user command to initiate a voice recognition mode is input from a user, the display apparatus enters the voice recognition mode to recognize a user's voice according to an input user command (operation S810). In the voice recognition mode, the display apparatus receives a voice uttered by the user (operation S820). If the user's uttered voice is input, the display apparatus collects the user's uttered voice, converts the collected voice into a digital signal, and transmits the voice to a first server (operations S830 and S840). The first server may be a server that converts the user's uttered voice which has been converted into the digital signal into text information. If the text information regarding the user's uttered voice is received from the first server, the display apparatus transmits the text information regarding the user's uttered voice to a second server (operation S850). The second server may be a server that generates response information appropriate to the user's uttered voice according to an utterance element extracted from the user's uttered voice.

If the response information appropriate to the user's uttered voice is received from the second server, the display apparatus performs an operation corresponding to the user's uttered voice based on the response information (operation S860). The response information may be generated in a different form according to a function classified based on the utterance element extracted from the user's uttered voice. The function classified by the extracted utterance element may include at least one of an EPG-related function and a function regarding operation control of the display apparatus. For example, if the utterance element extracted from the user's uttered voice pertains to a broadcast program, the function may be the EPG-related function, and, if the utterance element pertains to power on/off of the display apparatus, channel change, or volume change, the function may be the function regarding the control of operations of the display apparatus. Accordingly, if the response information is received from the second server, the display apparatus may perform at least one of an operation of outputting a response message corresponding to the user's uttered voice and an operation of performing a function based on the response information.

For example, if a voice saying "Please record the program ○○○ (program title) which airs today" is input from the user, the display apparatus converts the uttered voice saying "Please record the program ○○○ (program title) which airs today" into a digital signal, and transmits the uttered voice to the first server. The first server then converts the received digital signal to text information, and transmits the text information to the display apparatus. After that, if text information regarding the uttered voice saying "Please record the program ○○○ (program title) which airs today" is received by the display apparatus from the first server, the display apparatus transmits the text information regarding the uttered voice saying "Please record the program ○○○ (program title) which airs today" to the second server. Accordingly, the second server extracts utterance elements, "today", "program ○○○", and "record", from the text information regarding the user's uttered voice, saying "Please record the program ○○○ which airs today.", and determines that the function is the EPG-related function based on the extracted utterance elements. After that, the second server transmits response information including a control command to schedule a recording of the program ○○○, and a response message saying "the recording of the program ○○○ has been scheduled" to the display apparatus.

Accordingly, the display apparatus schedules the recording of the program ○○○ (program title) according to the control command included in the response information. The display apparatus outputs the response message saying "the recording of the program ○○○ has been scheduled" through at least one of an image and a voice, based on the response message included in the response information. Accordingly, the response message saying "the recording of the program ○○○ has been scheduled" may be output as a voice or may be output as an image of a text format.

The exemplary embodiment which is realized if the utterance element extracted from the user's uttered voice pertains to the control of operations of the display apparatus has been described above with reference to FIG. 5, and thus a detailed description thereof is omitted.

If the user's uttered voice includes utterance elements regarding a plurality of requests, the display apparatus receives a voice re-request message regarding the user's uttered voice from the second server, and outputs the voice re-request message.

For example, the second server may receive text information regarding an uttered voice saying "Please schedule the program ○○○ (program title) which airs this week, for watching, and please record the program ○○○" from the display apparatus. In this case, the uttered voice saying "Please schedule the program ○○○ which airs this week, for watching, and please record the program ○○○", includes utterance elements ("program ○○○ (program title)", "schedule for watching", "program ○○○ (program title)", and "record") regarding a plurality of requests.

Accordingly, the second server determines that the text information regarding the uttered voice includes the utterance elements regarding the plurality of requests, and transmits response information including a voice re-request message to the display apparatus. Accordingly, the display apparatus outputs the voice re-request message received from the second server through at least one of an image and a voice. Accordingly, the user re-requests only one of "Please schedule the program ○○○ (program title) which airs this week, for watching" and "Please record the program ○○○ which airs this week".

If the user's uttered voice includes a prohibited utterance element, the display apparatus may output a disallowed message regarding an operation corresponding to the uttered voice based on the response information received from the second server.

For example, the display apparatus may transmit text information regarding an uttered voice which includes an utterance element of a profanity or a prohibited drug to the second server. In this case, the second server extracts the utterance element from the text information regarding the uttered voice, and determines whether the extracted utterance element is a prohibited utterance element, which is pre-stored. As a result of the determining, if the extracted utterance element is a prohibited utterance element, the second server transmits response information including a disallowed message regarding an operation corresponding to the uttered voice to the display apparatus. Accordingly, the display apparatus outputs the disallowed message saying "The request is refused" through at least one of an image and a voice according to the response information.

According to the exemplary embodiments described above with reference to FIG. 5, the display apparatus may receive response information which is generated in a different form according to the user's uttered voice from the second server, and may perform an operation corresponding to the user's uttered voice based on the response information.

Up to now, the method for performing the operation based on the response information appropriate to the user's uttered voice in the display apparatus has been described in detail. Hereinafter, a method for generating response information appropriate to a user's uttered voice and providing the response information to a display apparatus in an interactive server according to an exemplary embodiment will be explained.

Figure 9:
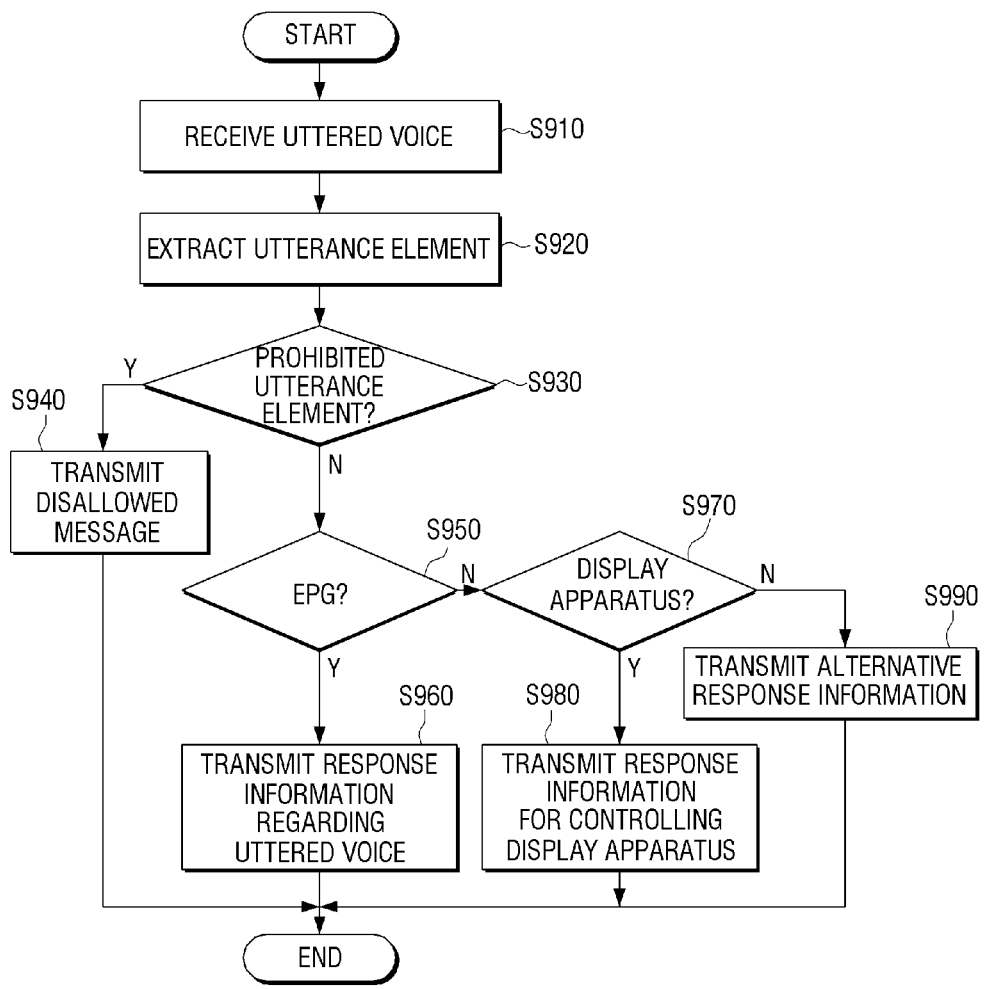
FIG. 9 is a flowchart illustrating a method for providing response information appropriate to a user's uttered voice to a display apparatus in an interactive server according to an exemplary embodiment.

FIG. 9 is a flowchart illustrating a method for providing response information appropriate to a user's uttered voice to a display apparatus in an interactive server according to an exemplary embodiment.

As shown in FIG. 9, the interactive server receives a user's uttered voice or text information corresponding to the user's uttered voice from the display apparatus (operation S901). The interactive server is the above-described second server and may receive the user's uttered voice which has been converted into text information through the first server from the display apparatus. If such an uttered voice is received, the interactive server extracts an utterance element from the uttered voice (operation S920).

The utterance element includes a dialog act, a main goal, and a key element. The dialog act may be a label indicating an illocutionary force regarding a user's uttered voice. For example, the dialog act may be a statement, a request, or a question. The main goal may be a label indicating a user's real intention from a user's uttered voice, and may be TV on/off, a program search, a program time search, or program scheduling. The key element may be a genre, a program title, a time, a channel name, or an actor's name.

For example, if the user's uttered voice is "What time does the program ○○○ start?", the dialog act may indicate the interrogative expression including a question mark "?", and the main goal may be a program time search because of the word "start". The key element may be the program name ○○○. Accordingly, if text information regarding the user's uttered voice saying "What time does the program ○○○ start?" is received, the interactive server may extract utterance elements including the dialog act, the main goal, and the key element from the text information.

If such utterance elements are extracted, the interactive server determines whether the extracted utterance elements are recorded on a pre-stored table regarding a prohibited utterance element, and determines whether the extracted utterance elements are prohibited utterance elements (operation S930). As a result of the checking, if the utterance elements are the prohibited utterance elements, the interactive server generates a disallowed message and transmits the same to the display apparatus (operation S940).

For example, the user's uttered voice may be a voice containing a profanity or a prohibited drug. If an utterance element regarding the profanity or the prohibited drug is extracted from the uttered voice, the interactive server determines whether the extracted utterance element is recorded on the table regarding the utterance element with reference to the pre-stored table regarding the prohibited utterance element. As a result of the checking, if the extracted utterance element is recorded on the pre-stored table regarding the utterance element, the interactive server may generate a disallowed message regarding an operation corresponding to the user's uttered voice.

As another example, the user's uttered voice may be a voice associated with a user's age limit. For example, if the user's uttered voice is "Do you wish to change the channel to an adult broadcast channel?", utterance elements "adult broadcast", "channel", "change", and "do you wish" may be extracted. If such utterance elements are extracted, the interactive server determines whether the extracted utterance elements are associated with a user's age with reference to the pre-stored table in the storage regarding the prohibited utterance element. Accordingly, the interactive server determines whether or not the user meets the age limit based on user information received from the display apparatus. As a result of the determining, if the user is not authorized to watch the adult broadcast channel, the interactive server may generate a disallowed message saying "The service is not available".

If it is determined that the utterance element extracted from the user's uttered voice is not a prohibited utterance element or if the user meets the age limit and is authorized to use the service at operation S930, the interactive server determines whether or not the extracted utterance element is an EPG-related utterance element (operation S950). As a result of the determining, if the utterance element is an EPG-related utterance element, the interactive server generates response information corresponding to the user's uttered voice based on the pre-stored EPG information and transmits the response information to the display apparatus (operation S960). If the utterance element extracted from the user's uttered voice is an EPG-related utterance element, the interactive server may generate response information corresponding to the user's uttered voice by performing the following steps.

Figure 10:
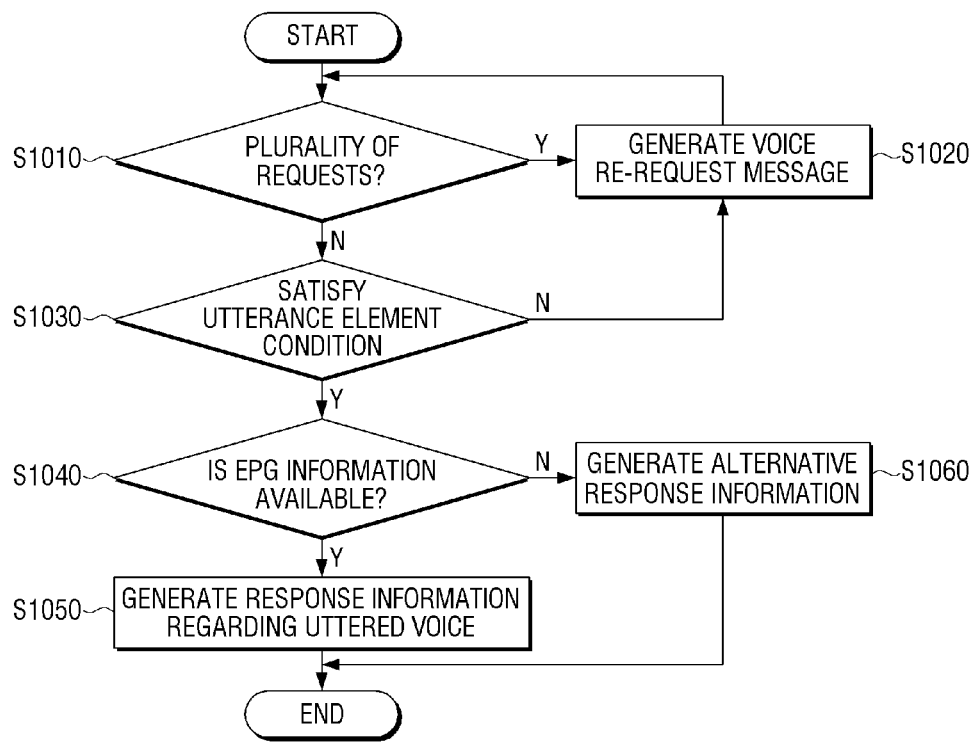
FIG. 10 is a flowchart illustrating a method for generating response information corresponding to a user's uttered voice if a user's uttered voice includes an EPG-related utterance element in an interactive server according to an exemplary embodiment.

FIG. 10 is a flowchart illustrating a method for generating response information corresponding to a user's uttered voice if the user's uttered voice includes an EPG-related utterance element in an interactive server.

As shown in FIG. 10, if an utterance element is extracted from a user's uttered voice, the interactive server determines whether the extracted utterance element includes an EPG-related utterance element regarding a plurality of requests (operation S1010). As a result of the determining, if the extracted utterance element is an EPG-related utterance element regarding a plurality of requests, the interactive server generates a voice re-request message (operation S1020).

For example, if the user's uttered voice is "Please record the program ○○○ which airs this week and please schedule the program ΔΔΔ (program title) for watching", the utterance element may be "this week", "program ○○○ (program title)", "program ΔΔΔ (program title)", "record", "watching", and "please". If such utterance elements are extracted, the interactive server determines that the extracted utterance elements include utterance elements regarding a plurality of requests ("program ○○○ (program title)", "program ΔΔΔ (program title)", "record", "watching"). Accordingly, the interactive server 730 may generate a voice re-request message saying "Please request only one" based on pre-stored conversation history information.

If the utterance element extracted from the user's uttered voice does not include an EPG-related utterance element regarding a plurality of requests, the interactive server determines whether or not a condition for generating response information corresponding to the user's uttered voice is satisfied based on the utterance element extracted from the user's uttered voice (operation S1030). According to an exemplary embodiment, if the utterance element extracted from the user's uttered voice includes all of the dialog act, the main goal, and the key element, the interactive server determines whether a condition for generating response information corresponding to the user's uttered voice is satisfied. For example, the utterance element extracted from the user's uttered voice saying "what time does the program ○○○ start?" includes all of the dialog act, the main goal, and the key element. In this case, the interactive server may determine that the condition for generating the response information corresponding to the user's uttered voice is satisfied.

If it is determined that the condition for generating the response information corresponding to the user's uttered voice is not satisfied, the interactive server may generate a voice re-request message by going through operation S1020 described above. For example, the user's uttered voice saying "what time does it start?" includes only the utterance element regarding the dialog act indicating the interrogative expression including a question mark (?) and the main goal of the word "start", but does not include the key element. In this case, the interactive server determines that the condition for generating the response information corresponding to the user's uttered voice is not satisfied. Accordingly, the interactive server generates response information asking for an utterance element regarding a key element based on the conversation history information pre-stored in the storage.

If it is determined that the condition for generating the response information corresponding to the user's uttered voice is satisfied at operation S1030, the interactive server determines whether it is possible to provide the response information corresponding to the user's uttered voice based on the pre-stored EPG information (operation S1040). As a result of the determining, if it is possible to provide the response information corresponding to the user's uttered voice based on the EPG information, the interactive server generates the response information corresponding to the user's uttered voice based on the EPG information (operation S1050). However, if it is determined to be impossible to provide the response information corresponding to the user's uttered voice based on the EPG information, the interactive server generates alternative response information regarding the uttered voice based on at least one of the pre-stored EPG information or an Internet search (operation S1060).

For example, if the user's uttered voice is "Please record the program ○○○ which airs this week", the utterance elements are "this week", "program ○○○ (program title)", "record", and "please". If such utterance elements are extracted, the interactive server may obtain program information and start time information regarding the program ○○○ from the pre-stored EPG information. Accordingly, the interactive server may generate response information including a control command regarding a scheduled recording of the program ○○○ based on the pre-obtained program information and time start information, and a response message generated based on the pre-stored conversation history information. If the user's uttered voice is "Who is the star in the program ○○○ (program title)?", the utterance elements may be "program ○○○ (program title)", "star", and "who". If such utterance element is extracted, the interactive server determines whether information on the star of the program ○○○ is included in the pre-stored EPG information. As a result of the checking, if it is impossible to obtain the information on the star of the program ○○○ (program title) from the pre-stored EPG information, the interactive server generates alternative response information asking whether the user wishes to receive alternative information regarding the user's uttered voice through EPG information or an Internet search. For example, if a user's voice indicating that the user wishes to receive alternative information from the EPG information is input, the interactive server obtains information on the cast of the program ○○○ from the pre-stored EPG information. If the alternative information regarding the user's uttered voice is obtained from the EPG information, the interactive server may generate alternative response information including the pre-obtained alternative information based on the pre-stored conversation history information.

If the utterance element extracted from the user's uttered voice is associated with control of the display apparatus at operation S950, the interactive server determines whether it is possible to control the operation of the display apparatus corresponding to the user's uttered voice based on the extracted utterance element (operation S970). As a result of the determining, if it is possible to control the operation of the display apparatus, the interactive server generates response information for controlling the operation of the display apparatus and transmits the response information to the display apparatus (operation S980).

According to an exemplary embodiment, the interactive server may store manual information for controlling the operation of the display apparatus 100. The manual information includes information for controlling the operation of the display apparatus 100 according to the user's uttered voice and information for controlling the operation of the display apparatus 100 according to other control commands except for the user's uttered voice. Accordingly, if an utterance element regarding control of the display apparatus 100 is extracted, the interactive server determines whether or not the operation of the display apparatus 100 is controllable according to the user's uttered voice or not based on the pre-stored manual information. As a result of the checking, if the operation of the display apparatus 100 is controllable according to the user's uttered voice, the interactive server may generate response information including a control command to perform an operation corresponding to the user's uttered voice.

For example, if the user's uttered voice is "Please change the channel to MBC", the utterance elements are "MBC", "channel", and "change". If such utterance elements are extracted, the interactive server determines that the extracted utterance elements are about control of the functions of the display apparatus 100. After that, the interactive server determines whether it is possible to change the channel of the display apparatus 100 according to the extracted utterance element with reference to the pre-stored manual information. As a result of the determining, if it is possible to change the channel of the display apparatus 100 according to the user's uttered voice, the interactive server may generate response information including a control command to change the current channel to MBC in the display apparatus.

If it is determined that it is impossible to control the operation of the display apparatus 100, the interactive server may generate alternative response information regarding the user's uttered voice, and transmit the alternative response information to the display apparatus (operation S990). The alternative response information may be associated with at least one of a method for controlling the operation of the display apparatus and a current state notification informing a current state of the display apparatus.

For example, if the user's uttered voice is "Please brighten the screen", utterance elements, "screen", "brighten", and "please" may be extracted. If such utterance elements are extracted, the interactive server determines that the utterance elements are about the control of a function of the display apparatus. After that, the interactive server determines whether it is possible to adjust the screen of the display apparatus according to the extracted utterance elements with reference to the pre-stored manual information. As a result of the determining, if it is impossible to adjust the screen of the display apparatus 100 according to the user's uttered voice, the interactive server may generate response information on a method for adjusting the screen of the display apparatus with reference to the pre-stored manual information.

The exemplary embodiments of the present disclosure have been described.

The foregoing exemplary embodiments are merely exemplary and are not to be construed as limiting the disclosure. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a voice collector which collects a user's uttered voice and generates a user voice signal;
a communication unit which transmits the user voice signal to an interactive server;
a controller which, if response information corresponding to the uttered voice which is transmitted to the interactive server is received from the interactive server, controls to perform an operation corresponding to the user's uttered voice based on the response information;
an output unit; and
a storage which matches a user input and user information with each other, and stores matching information,
wherein the response information is generated in a form which is based on a requested function of the display apparatus which is classified based on an utterance element extracted from the uttered voice,
wherein, if the uttered voice comprises a prohibited Utterance element, the controller, controls to output a message indicating disallowance of an operation corresponding to the uttered voice, based on the response information received from the interactive server, and
wherein the controller transmits user information matched with the user input and the uttered voice to the interactive server, and, if the prohibited utterance element is associated with the user's age, the controller outputs the message indicating disallowance of the operation corresponding to the uttered voice according to the response information generated based on the user information.

2. The display apparatus as claimed in claim 1, wherein the function comprises at least one of an electronic program guide (EPG)-related function and an operation control function of the display apparatus.

3. The display apparatus as claimed in claim 2, further comprising an output unit,
wherein, if the uttered voice comprises an EPG-related utterance element or an operation control-related utterance element of the display apparatus, the controller performs at least one of an operation of outputting a response message and an operation of performing the requested function, based on the response information received from the interactive server.

4. The display apparatus as claimed in claim 3, wherein, if the uttered voice comprises an EPG-related utterance element regarding a plurality of requests, the controller outputs a voice re-request message based on the response information received from the interactive server.

5. The display apparatus of claim 1, wherein the utterance element is a part of a plurality of words recognized in the uttered voice.

6. The display apparatus as claimed in claim 1, further comprising:
a photographing unit which photographs a user face,
wherein the user input comprises a face image of the user generated by the photographing unit.

7. The display apparatus as claimed in claim 1, wherein the interactive server comprises a first server which converts the collected user uttered voice into text information, and a second server which generates response information corresponding to the text information,
wherein the controller converts the collected voice into a digital signal and transmits the converted voice to the first server, and, if text information regarding the uttered voice is received from the first server, the display apparatus transmits the text information to the second server and receives response information corresponding to the uttered voice.

8. An interactive server comprising:
a communication unit which receives an uttered voice from a display apparatus;
an extraction unit which extracts an utterance element from the received uttered voice;
a controller which generates response information corresponding to the uttered voice in a form which is based on a requested function of the display apparatus, which is classified according to the extracted utterance element, and transmits the response information to the display apparatus; and
a storage which stores a table regarding a prohibited utterance element,
wherein, if the extracted utterance element comprises the prohibited utterance.

9. The interactive server as claimed in claim 8, wherein the function comprises at least one of an electronic program guide (EPG)-related function and an operation control function of the display apparatus.

10. The interactive server as claimed in claim 9, further comprising a storage which stores EPG information,
wherein, if the extracted utterance element is an EPG-related utterance element, the controller determines whether the EPG information corresponding to the uttered voice based on the EPG information stored in the storage can be provided,
wherein, if the EPG information can be provided, the controller generates response information corresponding to the uttered voice based on the EPG information, and, if the EPG information cannot be provided, the controller generates alternative response information regarding the uttered voice based on at least one of the EPG information and an Internet search.

11. The interactive server as claimed in claim 10, wherein, if the uttered voice comprises an EPG-related utterance element regarding a plurality of requests, the controller generates a voice re-request message to re-request a user to utter a single request in the display apparatus.

12. The interactive server as claimed in claim 9, wherein, if the extracted utterance element is an operation control-related utterance element of the display apparatus, the controller determines whether it is possible to control an operation of the display apparatus corresponding to the uttered voice based on the utterance element,
wherein, if the operation of the display apparatus can be controlled, the controller generates response information for controlling the operation of the display apparatus, and, if the operation of the display apparatus cannot be controlled, the controller generates response information regarding at least one of an operation control method of the display apparatus and a current state notification.

13. The interactive server as claimed in claim 8, wherein the communication unit further receives user information from the display apparatus,
wherein, if the extracted utterance element is associated with a user's age, the controller determines whether to generate the message indicating disallowance of the requested operation corresponding to the uttered voice based on the user information.

14. A method for providing response information corresponding to a user's uttered voice in an interactive server which is interlocked with a display apparatus, the method comprising:

receiving the user's uttered voice from the display apparatus;

extracting an utterance element from the uttered voice;

generating response information corresponding to the uttered voice in a form based on a requested function of the display apparatus, and which is classified according to the extracted utterance element; and transmitting the response information to the display apparatus, wherein the generating comprises:

determining whether the extracted utterance element comprises a prohibited utterance element with reference to a pre-stored table regarding the prohibited utterance element; and if it is determined that the extracted utterance element comprises the prohibited utterance element, generating a message indicating disallowance of an operation corresponding to the uttered voice.

15. The method as claimed in claim 14, wherein the receiving further receives user information from the display apparatus, and further comprises:

if it is determined that the extracted utterance element does not comprise the prohibited utterance element, then determining whether the extracted utterance element is associated with a user's age; and if it is determined that the extracted utterance element is associated with the user's age, generating the message indicating disallowance of the operation corresponding to the uttered voice based on user information.

16. The method as claimed in claim 14, wherein the function comprises at least one of an electronic program guide (EPG)-related function and an operation control function of the display apparatus, wherein the generating comprises:

determining whether the extracted utterance element is an EPG-related utterance element;

if it is determined that the extracted utterance element is the EPG-related utterance element, determining whether EPG information corresponding to the uttered voice based on pre-stored EPG information can be provided; and if it determined that the EPG information can be provided, generating response information corresponding to the utterance element based on the EPG information, and, if it is determined that the EPG information cannot be provided, generating alternative response information regarding the uttered voice based on at least one of the EPG information and an Internet search.

17. The method as claimed in claim 16, wherein the generating further comprises:

if it is determined that the extracted utterance element is the EPG-related utterance element, determining whether the uttered voice comprises an EPG-related utterance element containing a plurality of requests; and if it is determined that the uttered voice comprises the EPG-related utterance element containing the plurality of requests, generating a voice re-request message re-requesting the user to utter a voice in the display apparatus.

18. The method as claimed in claim 16, wherein the generating further comprises:

if it is determined that the extracted utterance element is an operation control-related utterance element of the display apparatus, determining whether an operation of the display apparatus corresponding to the uttered voice based on the utterance element can be controlled; and if it is determined that the operation of the display apparatus can be controlled, generating response information for controlling the operation of the display apparatus, and, if it is determined that the operation of the display apparatus cannot be controlled, generating response information regarding at least one of a method for controlling the operation of the display apparatus and a current notification state of the display apparatus.

19. A method for providing to a display apparatus, response information corresponding to a user's uttered voice, the method comprising:

inputting, at the display apparatus, a user's voice requesting the performance of a specified function;

transmitting the inputted user's voice to a first server;

converting, by the first server, the user's voice to text information;

transmitting, by the first server, the text information to the display apparatus;

transmitting, by the display apparatus, the text information to a second server, and receiving, from the second server response information corresponding to the requested specified function.

20. The method of claim 19, wherein the response is generated in a form that is based on utterance elements extracted from the user's voice.

21. The method of claim 20, wherein the specified function is at least one of an electronic program guide (EPG) function and a function regarding operation control of the display apparatus.

* * * * *